(12) United States Patent
Landis et al.

(10) Patent No.: US 12,363,568 B2
(45) Date of Patent: Jul. 15, 2025

(54) BEAM MEASUREMENT REPORTING FOR SPATIALLY OFFSET BEAMS

(71) Applicant: QUALCOMM Incorporated, San Diego, CA (US)

(72) Inventors: Shay Landis, Hod Hasharon (IL); Idan Michael Horn, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 453 days.

(21) Appl. No.: 17/857,727

(22) Filed: Jul. 5, 2022

(65) Prior Publication Data

US 2024/0015538 A1 Jan. 11, 2024

(51) Int. Cl.
*H04W 24/08* (2009.01)
*H04W 24/10* (2009.01)
*H04W 72/23* (2023.01)

(52) U.S. Cl.
CPC ........... *H04W 24/08* (2013.01); *H04W 24/10* (2013.01); *H04W 72/23* (2023.01)

(58) Field of Classification Search
CPC ..... H04W 24/08; H04W 24/10; H04W 72/23; H04B 7/0696; H04B 7/06968
See application file for complete search history.

(56) References Cited

U.S. PATENT DOCUMENTS

| | | | |
|---|---|---|---|
| 2018/0367374 A1* | 12/2018 | Liu | H04W 76/18 |
| 2021/0068123 A1* | 3/2021 | Zhu | H04W 72/046 |
| 2023/0208485 A1* | 6/2023 | Tiirola | H04B 7/0617 |
| | | | 370/329 |

OTHER PUBLICATIONS

International Search Report and Written Opinion—PCT/US2023/026489—ISA/EPO—Oct. 5, 2023.

* cited by examiner

*Primary Examiner* — Walli Z Butt
(74) *Attorney, Agent, or Firm* — Holland & Hart LLP

(57) ABSTRACT

Methods, systems, and devices for wireless communications are described. In some wireless communications systems, a user equipment (UE) may receive reference signals for a UE beam measurement procedure for measuring a set of network transmit beams corresponding to the set of reference signals. The UE may transmit a measurement report indicating measurements of the set of reference signals based on the UE beam measurement procedure, where the measurement report further includes an indication of one or more candidate network transmit beams that are additional to the set of network transmit beams and that are within an angular offset threshold from one or more network transmit beams of the set of network transmit beams. In response to transmitting the measurement report, the UE may receive a message indicating a configuration for communications with the network entity.

30 Claims, 16 Drawing Sheets

BEAM MEASUREMENT REPORTING FOR SPATIALLY OFFSET BEAMS

FIELD OF TECHNOLOGY

The following relates to wireless communications, including beam measurement reporting for spatially offset beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). In some examples, a beam that may be used for communication between a UE and a network entity may have spatial offset from one or more other beams.

SUMMARY

The described techniques relate to improved methods, systems, devices, and apparatuses that support beam measurement reporting for spatially offset beams. For example, the described techniques provide for a communication device (e.g., a user equipment (UE)) to support signaling of a measurement report (e.g., beam measurement report) that may indicate candidate network transmit beams to a network entity such that the network entity may configure the UE for future communications in accordance with the indicated candidate network transmit beams. For instance, a UE may receive a set of reference signals for a UE beam measurement procedure for measuring a set of network transmit beams corresponding to the set of reference signals for communications between a network entity and the UE. The UE may transmit a measurement report indicating measurements of the set of reference signals based on the UE beam measurement procedure. In some aspects, the measurement report may include an indication of one or more candidate network transmit beams that are additional to the set of network transmit beams, where the one or more candidate network transmit beams are within an angular offset threshold from one or more network transmit beams of the set of network transmit beams. In response to transmitting the measurement report, the UE may receive a message indicating a configuration for communication with the network entity.

A method for wireless communication at a user equipment (UE) is described. The method may include receiving a set of reference signals for a UE beam measurement procedure for measuring a set of multiple network transmit beams corresponding to the set of reference signals for communications between a network entity and the UE, transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and receiving a message indicating a configuration for communications with the network entity in response to transmitting the measurement report.

An apparatus for wireless communication at a UE is described. The apparatus may include a processor, memory coupled with the processor, and instructions stored in the memory. The instructions may be executable by the processor to cause the apparatus to receive a set of reference signals for a UE beam measurement procedure for measuring a set of multiple network transmit beams corresponding to the set of reference signals for communications between a network entity and the UE, transmit a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and receive a message indicating a configuration for communications with the network entity in response to transmitting the measurement report.

Another apparatus for wireless communication at a UE is described. The apparatus may include means for receiving a set of reference signals for a UE beam measurement procedure for measuring a set of multiple network transmit beams corresponding to the set of reference signals for communications between a network entity and the UE, means for transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and means for receiving a message indicating a configuration for communications with the network entity in response to transmitting the measurement report.

A non-transitory computer-readable medium storing code for wireless communication at a UE is described. The code may include instructions executable by a processor to receive a set of reference signals for a UE beam measurement procedure for measuring a set of multiple network transmit beams corresponding to the set of reference signals for communications between a network entity and the UE, transmit a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and receive a message indicating a configuration for communications with the network entity in response to transmitting the measurement report.

In some examples of the method, apparatuses, and non-transitory computer-readable medium described herein, the measurement report indicates that the one or more candidate network transmit beams may be directionally quasi-located with the one or more network transmit beams of the set of multiple network transmit beams.

In some examples of the method, apparatuses, and non-transitory computer-readable medium described herein, the set of multiple network transmit beams correspond to a first frequency range and the one or more candidate network transmit beams correspond to a second frequency range that may be different than the first frequency range and beam widths of beams in the first frequency range may be different than beam widths of beams in the second frequency range.

In some examples of the method, apparatuses, and non-transitory computer-readable medium described herein, receiving the message indicating the configuration may include operations, features, means, or instructions for receiving an indication of one or more candidate UE receive beams in response to transmitting the measurement report, where at least one of the one or more candidate UE receive beams corresponds to at least one of the one or more candidate network transmit beams that may be additional to the set of multiple network transmit beams.

In some examples of the method, apparatuses, and non-transitory computer-readable medium described herein, receiving the message indicating the configuration may include operations, features, means, or instructions for receiving an indication for the UE to add an additional beam pair including one or more candidate UE receive beams corresponding to at least one of the one or more candidate network transmit beams that may be additional to the set of multiple network transmit beams.

In some examples of the method, apparatuses, and non-transitory computer-readable medium described herein, the indication for the UE to add the additional beam pair may be based on at least one of one or more reflectors in an environment of the UE, the measurement report, the set of multiple network transmit beams, or a combination thereof.

In some examples of the method, apparatuses, and non-transitory computer-readable medium described herein, the configuration indicates one or more synchronization signal blocks associated with one or more candidate UE receive beams corresponding to at least one of the one or more candidate network transmit beams that may be additional to the set of multiple network transmit beams.

Some examples of the method, apparatuses, and non-transitory computer-readable medium described herein may further include operations, features, means, or instructions for performing the UE beam measurement procedure to measure the set of reference signals on the set of multiple network transmit beams to identify one or more power measurements associated with the set of multiple network transmit beams, where transmitting the measurement report includes transmitting the measurement report indicating one or more network transmit beams from the set of multiple network transmit beams in addition to the one or more candidate network transmit beams in accordance with the one or more power measurements.

Some examples of the method, apparatuses, and non-transitory computer-readable medium described herein may further include operations, features, means, or instructions for identifying a beam failure for at least one of the set of multiple network transmit beams and receiving a set of resources for a beam failure recovery procedure, where the set of resources includes at least one of the one or more candidate network transmit beams that may be additional to the set of multiple network transmit beams.

In some examples of the method, apparatuses, and non-transitory computer-readable medium described herein, the configuration may be received via at least one of a downlink control information (DCI) signaling, a medium access control (MAC) control element (MAC-CE) signaling, a radio resource control (RRC) signaling, or a combination thereof.

In some examples of the method, apparatuses, and non-transitory computer-readable medium described herein, the measurement report may be transmitted via at least one of a medium access control (MAC) control element (MAC-CE) signaling, an RRC signaling, or both.

A method for wireless communication at a network entity is described. The method may include transmitting a set of reference signals for a UE beam measurement procedure for measuring a set of multiple network transmit beams corresponding to the set of reference signals for communications between the network entity and a UE, receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and transmitting a message indicating a configuration for communications with the network entity in response to receiving the measurement report.

An apparatus for wireless communication at a network entity is described. The apparatus may include a processor, memory coupled with the processor, and instructions stored in the memory. The instructions may be executable by the processor to cause the apparatus to transmit a set of reference signals for a UE beam measurement procedure for measuring a set of multiple network transmit beams corresponding to the set of reference signals for communications between the network entity and a UE, receive a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and transmit a message indicating a configuration for communications with the network entity in response to receiving the measurement report.

Another apparatus for wireless communication at a network entity is described. The apparatus may include means for transmitting a set of reference signals for a UE beam measurement procedure for measuring a set of multiple network transmit beams corresponding to the set of reference signals for communications between the network entity and a UE, means for receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and means for transmitting a message indicating a configuration for communications with the network entity in response to receiving the measurement report.

A non-transitory computer-readable medium storing code for wireless communication at a network entity is described.

The code may include instructions executable by a processor to transmit a set of reference signals for a UE beam measurement procedure for measuring a set of multiple network transmit beams corresponding to the set of reference signals for communications between the network entity and a UE, receive a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams, and transmit a message indicating a configuration for communications with the network entity in response to receiving the measurement report.

In some examples of the method, apparatuses, and non-transitory computer-readable medium described herein, the measurement report indicates that the one or more candidate network transmit beams may be directionally quasi-located with the one or more network transmit beams of the set of multiple network transmit beams.

In some examples of the method, apparatuses, and non-transitory computer-readable medium described herein, the set of multiple network transmit beams correspond to a first frequency range and the one or more candidate network transmit beams correspond to a second frequency range that may be different than the first frequency range and beam widths of beams in the first frequency range may be different than beam widths of beams in the second frequency range.

In some examples of the method, apparatuses, and non-transitory computer-readable medium described herein, transmitting the message indicating the configuration may include operations, features, means, or instructions for transmitting an indication of one or more candidate UE receive beams in response to receiving the measurement report, where at least one of the one or more candidate UE receive beams corresponds to at least one of the one or more candidate network transmit beams that may be additional to the set of multiple network transmit beams.

In some examples of the method, apparatuses, and non-transitory computer-readable medium described herein, transmitting the message indicating the configuration may include operations, features, means, or instructions for transmitting an indication for the UE to add an additional beam pair including one or more candidate UE receive beams corresponding to at least one of the one or more candidate network transmit beams that may be additional to the set of multiple network transmit beams.

Some examples of the method, apparatuses, and non-transitory computer-readable medium described herein may further include operations, features, means, or instructions for determining to include the additional beam pair including one or more candidate receive beams in the configuration based on one of one or more reflectors in an environment of the UE, the measurement report, the set of multiple network transmit beams, or a combination thereof, where the indication for the UE to add the additional beam pair may be based on the determining.

In some examples of the method, apparatuses, and non-transitory computer-readable medium described herein, the configuration indicates one or more synchronization signal blocks associated with one or more candidate UE receive beams corresponding to at least one of the one or more candidate network transmit beams that may be additional to the set of multiple network transmit beams.

In some examples of the method, apparatuses, and non-transitory computer-readable medium described herein, receiving the measurement report may include operations, features, means, or instructions for receiving the measurement report indicating one or more network transmit beams from the set of multiple network transmit beams in addition to the one or more candidate network transmit beams in accordance with one or more power measurements at the UE.

Some examples of the method, apparatuses, and non-transitory computer-readable medium described herein may further include operations, features, means, or instructions for identifying a beam failure for at least one of the set of multiple network transmit beams and transmitting a set of resources for a beam failure recovery procedure, where the set of resources includes at least one of the one or more candidate network transmit beams that may be additional to the set of multiple network transmit beams.

In some examples of the method, apparatuses, and non-transitory computer-readable medium described herein, the configuration may be transmitted via at least one of a DCI signaling, a medium access control (MAC) control element (MAC-CE) signaling, an RRC signaling, or a combination thereof.

In some examples of the method, apparatuses, and non-transitory computer-readable medium described herein, the measurement report may be received via a medium access control (MAC) control element (MAC-CE) signaling, an RRC signaling, or both.

DETAILED DESCRIPTION

Figure 1:
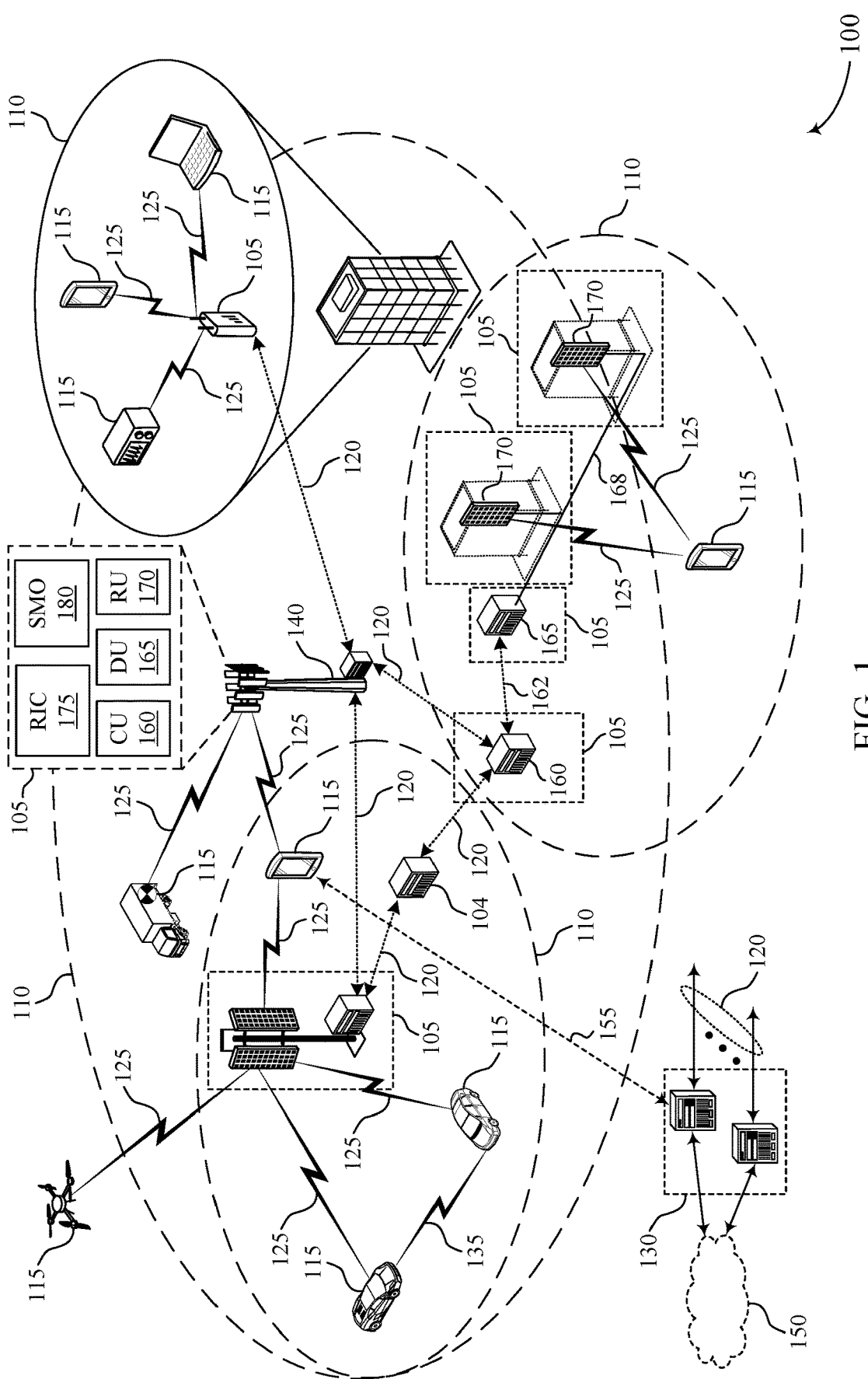
FIG. 1 illustrates an example of a wireless communications system that supports beam measurement reporting for spatially offset beams in accordance with one or more aspects of the present disclosure.

In some wireless communications systems, a user equipment (UE) may be configured to perform beam management procedures (e.g., for beam acquisition, beam tracking) based on a set of transmit beams. For higher frequency bands (e.g., frequency range (FR) 4 ranging between 52.6 Gigahertz (GHz) to 71 GHz, FR5 ranging between 95 GHz to 325 GHz, etc.), the UE may perform the beam management procedures with narrower transmit beams than those used for lower frequency bands (e.g., FR2 ranging between 24.25 GHz to 52.6 GHz) in order to overcome path loss resulting from the use of a higher frequency carrier. As the transmit beams used for performing beam management procedures become narrower with increasing frequencies, the quantity of beam pair possibilities may subsequently increase, thereby causing the UE to perform the beam management procedures with greater complexity. In some cases, the UE may use wider transmit beams for coarse direction of various transmit beams from the network entity (e.g., network transmit beams), and the UE may refine the coarse direction by using narrower transmit beams. However, some frequency beams may not be directionally quasi-colocated with the network transmit beams. Although some beams between lower frequency bands and higher frequency bands may not be directionally quasi-colocated with the network transmit beams, the UE may perform monitoring of such beams when performing the configured beam management procedures, contributing to overhead for the beam management procedures. Such unnecessary overhead may contribute to higher power consumption and less efficient beam management procedures.

Techniques described herein support signaling to improve beam measurement reporting for spatially offset beams by using information regarding angular offset between UE beams to reduce overhead of beam reporting from a UE. For example, a UE may receive a set of reference signals from a network entity, where the set of reference signals may be for a UE beam measurement procedure for measuring a set of network transmit beams corresponding to the set of reference signals for communications with the network entity. As part of the UE beam measurement procedure, the UE may perform initial measurements (e.g., received signal strength indicator (RSSI) or reference signal received power (RSRP) measurements or both) based on the set of network transmit beams from the network entity. Upon performing the UE beam measurement procedure, the UE may transmit a measurement report indicating measurements of the set of reference signals corresponding to the set of network transmit beams. In addition to reporting such measurements, the UE may report an indication of one or more candidate (e.g., potential) network transmit beams that are additional to the set of network transmit beams (e.g., not included within the set of network transmit beams) and within some angular offset threshold of one or more of the set of network transmit beams.

Based on the indication of the one or more candidate network transmit beams included in the report and based on the network entity's geometric understanding of the UE's environment, the network entity may have knowledge of the angular offset between the current receive beams associated with the set of network transmit beams and the one or more candidate network transmit beams. The UE may receive a message from the network entity indicating a configuration for communications with the network entity in response to transmitting the measurement report. Because the network entity may determine whether the one or more candidate network transmit beams are directionally quasi-colocated with one or more of the set of network transmit beams based on the measurement report from the UE and the known angular offset information, the UE and the network entity may support more efficient beam measurement procedures, contributing to reduced latency, reduced power consumption, and improved mobility at the UE.

Aspects of the disclosure are initially described in the context of wireless communications systems. An example of a process flow supporting signaling for improved beam measurement reporting for spatially offset beams is described. Aspects of the disclosure are further illustrated by and described with reference to apparatus diagrams, system diagrams, and flowcharts that relate to beam measurement reporting for spatially offset beams.

FIG. 1 illustrates an example of a wireless communications system 100 that supports beam measurement reporting for spatially offset beams in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support beam measurement reporting for spatially offset beams as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In the wireless communications system 100, a UE 115 may be configured to perform beam management procedures based on a set of network transmit beams from a network entity 105. The UE 115 may perform communications with the network entity 105 using a beam pair in accordance with the beam management procedure. For instance, the UE 115 may be configured to perform beam acquisition, beam tracking, or both, to establish high quality connection with the network entity 105 on a selected set of beams. In some examples, the UE 115 may perform beam management procedures on lower frequency bands (e.g., FR2) by using narrow directional analog beams (e.g., phased array) in addition to beam acquisition and tracking signals. Additionally, or alternatively, the UE 115 may perform beam management procedures on higher frequency bands (e.g., FR4, FR5) by using narrower beams to overcome the additional path loss that comes from using higher frequency carriers. As the transmit beams used for performing beam management procedures become narrower, the quantity of beam pair possibilities for performing communications with the network entity 105 increases, causing the UE 115 to perform beam acquisition, beam tracking, or other beam management procedures with greater complexity.

In some cases, the UE 115 may perform beam management procedures by utilizing wider beams in higher bands for beam acquisition and beam tracking. However, in some such cases, the UE 115 may limit coverage by using wider beams instead of using narrow beams on the higher bands. In some cases, the UE 115 may perform beam management procedures by performing beam measurements on lower frequency bands using directional beams to assist beam measurements on higher frequency bands. For example, the UE 115 may use wider transmit beams for coarse direction of various transmit beams from the network entity 105 (e.g., network transmit beams), and the UE 115 may refine the coarse direction by using narrower transmit beams. However, beams between lower frequency bands and higher frequency bands (e.g., beams between FR2 and FR4/5) may not be directionally quasi-colocated with the network transmit beams. In some cases, width of some such beams may be larger than that of the network transmit beams on the higher bands. Moreover, the beams between the lower frequency bands and the higher frequency bands may have some angular offset from the network transmit beams that is greater than a predefined threshold for the UE. Although some beams between lower and higher frequency bands may not be directionally quasi-colocated with the network transmit beams, the UE 115 may unnecessarily monitor such beams when performing beam management procedures, contributing to unnecessary overhead for the beam management procedures. Such unnecessary overhead may contribute to higher power consumption and less efficient beam management procedures.

To reduce overhead for a beam management procedure, the UE 115 may indicate one or more candidate network transmit beams to the network entity 105 in a measurement report such that the UE 115 may receive a configuration for communications with the network entity 105 in response to transmitting the measurement report. For instance, in some examples, the UE 115 may receive a set of reference signals for a UE beam measurement procedure for measuring a set of network transmit beams corresponding to the set of reference signals for communications between the network entity 105 and the UE 115. Additionally, the UE 115 may generate a measurement report indicating measurements of the set of reference signals based on the UE beam measurement procedure. In some aspects, the measurement report may include an indication of one or more candidate network transmit beams that are additional to the set of network transmit beams and are within an angular offset threshold from one or more network transmit beams of the set of network transmit beams. The measurement report may indicate that the one or more candidate network transmit beams are directionally quasi-colocated with the one or more network transmit beams of the set of network transmit beams. In response to transmitting the measurement report, the UE 115 may receive a message that indicates a configuration for communications with the network entity 105. Accordingly, the network entity 105 may configure the UE 115 based on the one or more candidate network transmit beams indicated in the measurement report, reducing beam management and beam acquisition overhead.

Figure 2:
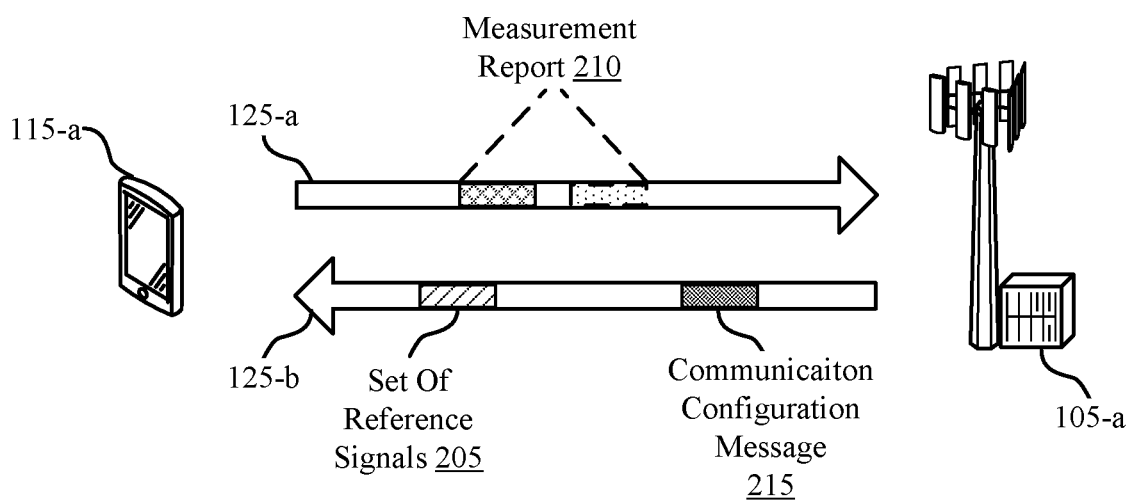
FIG. 2 illustrates an example of a wireless communications system that supports beam measurement reporting for spatially offset beams in accordance with one or more aspects of the present disclosure.

FIG. 2 illustrates an example of a wireless communications system 200 that supports beam measurement reporting for spatially offset beams in accordance with one or more aspects of the present disclosure. The wireless communications system 200 may include a UE 115-a and a network entity 105-a, which may be examples of the UE 115 and the network entity 105 as described with reference to FIG. 1. In some cases, the UE 115-a may indicate candidate network transmit beams in a measurement report transmitted to the network entity 105-a, and the network entity 105-a may configure the UE 115-a for communications in accordance with the measurement report, reducing overhead, latency, and power consumption for beam management procedures.

The UE 115-a may communicate with the network entity 105-a via a communication link 125-a and a communication link 125-b. For example, the UE 115-a may transmit messages to the network entity 105-a via the communication link 125-*a*, and the network entity 105-*a* may transmit messages to the UE 115-*a* via the communication link 125-*b*. In some examples, the UE 115-*a* and the network entity 105-*a* may communicate via a bidirectional communication link (not illustrated in FIG. 2).

In some examples, the UE 115-*a* may receive a set of reference signals 205. The set of reference signals 205 may be configured for a UE beam measurement procedure for measuring a set of network transmit beams corresponding to the set of reference signals and for communications with the network entity 105-*a*. The set of network transmit beams may be transmitted to the UE 115-*a* on lower frequency bands (e.g., FR2), on higher frequency bands (e.g., FR4, FR5), or a combination thereof. In some examples, the set of network transmit beams may be within a line of sight of the UE 115. Additionally, or alternatively, the set of network transmit beams may reflect off one or more reflectors during transmission of the set of reference signals 205. In some aspects, the network entity 105-*a* may have a geometric understanding of the environment of the UE 115-*a*. For example, the network entity 105-*a* may have information regarding the location of the UE 115-*a* and one or more reflectors that may impact beam paths to and from the UE 115-*a*.

In some examples, the UE 115-*a* may perform measurements 220 (e.g., RSSI, RSRP) of the set of network transmit beams corresponding to the set of reference signals 205 based on a synchronization signal block (SSB). The UE 115-*a* may transmit a measurement report 210 indicating the measurements 220 of the set of reference signals 205 based on the UE beam measurement procedure. The UE 115-*a* may transmit the measurement report via at least one of a MAC-CE signaling, an RRC signaling, or both. In some examples, the measurements 220 may include RSSI measurements, RSRP measurements, or both, for FR2 beams. Additionally, or alternatively, the measurements 220 may include RSSI measurements, RSRP measurements, or both, for FR4 or FR5 beams. Based on performing the UE beam measurement procedure, the UE 115-*a* may report one or more candidate (e.g., potential) network transmit beams that are in the same general direction as one or more of the set of network transmit beams, where the one or more candidate network transmit beams are additional to the set of network transmit beams associated with the set of reference signals 205. For example, the measurement report 210 may include a candidate network transmit beam(s) indication 225 that indicates the one or more candidate network transmit beams excluded from the set of network transmit beams.

While the one or more candidate network transmit beams may be in the same general direction, the one or more candidate network transmit beams may be within some angular offset threshold (e.g., in azimuth, in elevation) from one or more network transmit beams of the set of network transmit beams. Accordingly, the measurement report 210 may include the candidate network transmit beam(s) indication 225 in addition to the measurements 220 of the set of reference signals 205. If the one or more candidate network transmit beams are within an angular offset threshold from the one or more network transmit beams, the one or more candidate network transmit beams may be directionally quasi-colocated with the one or more network transmit beams. Therefore, the measurement report 210 may indicate measurements 220 of the set of reference signals 205 and one or more candidate network transmit beams that are directionally quasi-colocated with the one or more network transmit beams of the set of network transmit beams.

In some examples, the UE 115-*a* may report one or more candidate network transmit beams in the same frequency range as the set of network transmit beams, but with some angular offset in azimuth or elevation relative to one or more of the set of network transmit beams. In some such examples, the beam widths of the one or more candidate network transmit beams may be similar to the beam widths of the one or more of the set of network transmit beams because the set of network transmit beams and the one or more candidate network transmit beams share the same frequency range.

In some examples, the UE 115-*a* may report one or more candidate network transmit beams in a different frequency range from one or more of the set of network transmit beams. For example, the set of network transmit beams may correspond to a first frequency range and the one or more candidate network transmit beams may correspond to a second frequency range that is different than the first frequency range. Beam widths of beams in the first frequency range may be different than beam widths of beams in the second frequency range because the first frequency range is different from the second frequency range. For instance, if the UE-115 measures the set of network transmit beams corresponding to FR2, the UE 115-*a* may indicate one or more candidate network beams corresponding to FR4 or FR5 that are in the same general direction to the set of network transmit beams corresponding to FR2, but with some angular offset in azimuth or elevation relative to one or more of the set of network transmit beams corresponding to FR2.

By knowing the geometry of the possible network transmit beams and their respective paths toward the UE 115-*a*, the network entity 105-*a* may determine candidate beams for the UE 115-*a* based on the UE's report of their angle in comparison with the beams being used or the beams reported recently by the UE 115-*a*. In some examples, the network entity 105-*a* may configure various network transmit beams towards the one or more candidate network transmit beams in accordance with the measurement report 210. For example, the network entity 105-*a* may be aware of the location of the UE 115-*a* and one or more reflectors located in the environment of the UE 115-*a*, where the one or more reflectors may impact the paths of the set of network transmit beams and the candidate network transmit beams. In some examples, the UE 115-*a* may be associated with a predetermined angular offset threshold indicating a maximum angle in azimuth or elevation at which beams received at the UE 115-*a* are quasi-colocated. If the measurement report 210 indicates the one or more candidate network transmit beams that are within the angular offset threshold, the network entity 105 may determine one or more corresponding candidate UE receive beams based on the geometric understanding of the network entity 105-*a*. The geometric understanding may relate to an environment of the UE 115-*a* (e.g., the environment where the UE 115-*a* is located), the measurement report 210, a previous measurement report, or the set of network transmit beams, or a combination thereof. For example, the network entity 105-*a* may determine candidate UE receive beams to be used in a higher frequency range (e.g., FR4 or FR5) based on the measurement report 210, even if the measurement report 210 indicates measurements of a set of transmit beams for a lower frequency range (e.g., FR2).

In some aspects, the UE 115-*a* may receive a communication configuration message 215 (e.g., message indicating a configuration for communications) for communications with the network entity 105-*a* in response to transmitting the measurement report 210. Accordingly, the UE 115-*a* may scan beams in accordance with the communication configuration message 215, reducing beam management and beam acquisition overhead. The UE 115-*a* may receive the configuration (or the communication configuration message 215 indicating the configuration) via at least one of a DCI signaling, a MAC-CE signaling, a RRC signaling, or a combination thereof.

In some examples, the UE 115-*a* may receive an indication of one or more candidate (e.g., potential) UE receive beams in response to transmitting the measurement report 210. In such examples, at least one of the one or more candidate UE receive beams may correspond to at least one of the one or more candidate network beams indicated by the candidate network transmit beam(s) indication 225 from the measurement report 210.

Additionally, or alternatively, the UE 115-*a* may receive an indication indicating that the UE 115-*a* should add an additional beam pair for communications with the network entity 105-*a*, where the additional beam pair includes one or more candidate UE receive beams corresponding to at least one of the one or more candidate network transmit beams indicated by the candidate network transmit beam(s) indication 225 from the measurement report 210. In some examples, the network entity 105-*a* may configure the UE 115-*a* to add the additional beam pair for spatial MIMO. Additionally, or alternatively, the network entity 105-*a* may configure the UE 115-*a* to add the additional beam pair to support a beam switch to the additional beam pair in order to allow for better reception or avoid coming blockage. In some examples, the network entity 105-*a* may use knowledge of reflectors in the environment of the UE 115-*a*, the measurement report 210, the set of network transmit beams associated with the set of reference signals 205, or a combination thereof to transmit the indication for the UE 115-*a* to add the additional beam pair.

In some examples, the configuration indicated by the communication configuration message 215 may indicate one or more SSBs associated with one or more candidate UE receive beams corresponding to at least one of the one or more candidate network transmit beams indicated by the candidate network transmit beam(s) indication 225 in the measurement report 210. For example, the network entity 105-*a* may indicate the SSBs associated with a candidate UE receive beams associated with a candidate network transmit beam indicated to the network entity 105-*b* by the measurement report 210 such that the UE 115-*a* may reduce scanning for potential good beams, thus saving processing and power for the UE 115-*a*.

In some examples, the UE 115-*a* may request one or more special purpose SSBs, one or more tracking reference signals (TRSs), or a combination thereof, that are in the same general direction in another frequency range (e.g., FR4 or FR5) as a specific network transmit beam of the set of network transmit beams associated with the set of reference signals 205, but with some angular offset. For instance, based on measuring the set of reference signals 205 associated with a set of network transmit beams on FR2, the UE 115-*a* may request a special purpose TRS on FR4 that has some angular offset from one network transmit beam of the set of network transmit beams, but is still in the same vicinity of the one network transmit beam.

In some examples, the UE 115-*a* may request an indication from the network entity 105-*a* of a group of FR4 or FR5 beams in the same general direction as a specific network transmit beam of the set of network transmit beams associated with the set of reference signals 205, but with some angular offset. For instance, based on measuring the set of reference signals 205 associated with a set of network transmit beams on FR2, the UE 115-*a* may request an indication of a set of network transmit beams on FR4 or FR5 in the vicinity of the set of network transmit beams on FR2, but with angular offset between the set of network transmit beams on FR2 and the set of network transmit beams on FR4 or FR5.

Figure 3:
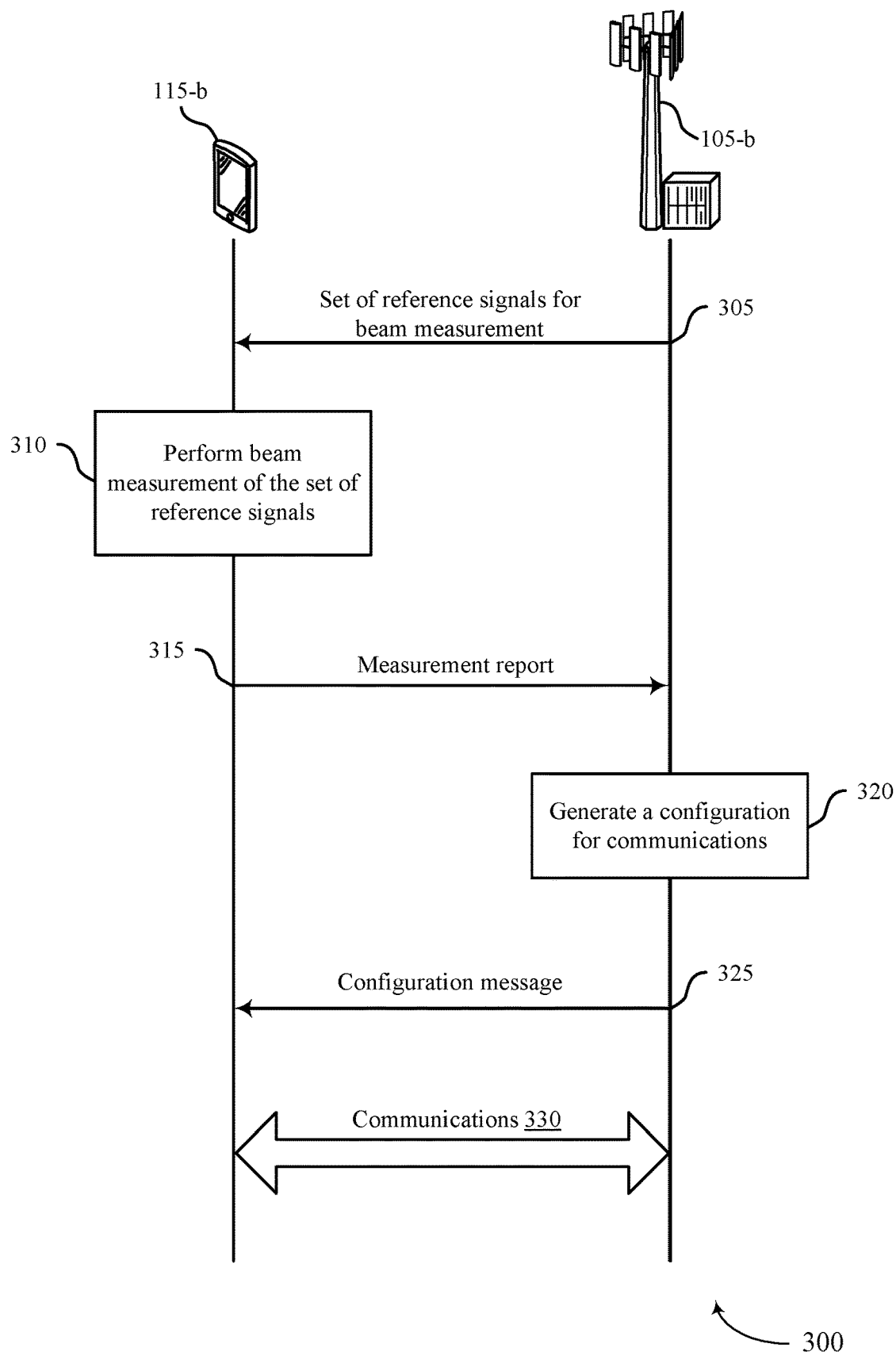
FIG. 3 illustrates an example of a process flow that supports beam measurement reporting for spatially offset beams in accordance with one or more aspects of the present disclosure.

FIG. 3 illustrates an example of a process flow 300 in a system that supports beam measurement reporting for spatially offset beams in accordance with one or more aspects of the present disclosure. The process flow 300 may implement or be implemented by aspects of wireless communications systems 100 or 200. For example, the process flow 300 may illustrate operations between a UE 115-*b* and a network entity 105-*b*, which may be examples of a UE 115 and a network entity 105, as described with reference to FIG. 1 and FIG. 2.

In the following description of the process flow 300, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 300, and other operations may be added to the process flow 300.

At 305, the UE 115-*b* may receive, and the network entity 105-*b* may transmit, a set of reference signals for a UE beam measurement procedure for measuring a set of network transmit beams corresponding to the set of reference signals for communications between the network entity 105-*b* and the UE 115-*b*. In some examples, the set of network transmit beams may be on FR2. Additionally, or alternatively, the set of network transmit beams may be on FR4 or FR5.

In some examples, the UE 115-*b* may perform the UE beam measurement procedure to measure the set of reference signals on the set of network transmit beams to identify one or more power measurements associated with the set of network transmit beams. For instance, the UE 115-*b* may identify RSSI or RSRP measurements associated with the set of network transmit beams by measuring the set of reference signals on the set of network transmit beams during the UE beam measurement procedure.

At 310, the UE 115-*b* may transmit, and the network entity 105-*b* may receive, a measurement report indicating measurements of the set of reference signals based on the UE beam measurement procedure. The UE 115-*b* may transmit the measurement report via at least one of a MAC-CE signaling, an RRC signaling, or both. In some examples, the measurement report may include an indication of one or more candidate network transmit beams that are additional to the set of network transmit beams and that are within an angular offset threshold from one or more network transmit beams of the set of network transmit beams. For example, the one or more candidate network beams may be beams that are not within the set of network transmit beams, but that are beams that the UE is able to receive. For instance, the UE 115-*b* may report candidate network beams that are in the same general direction as the set of network transmit beams, and that are within some angular offset in azimuth or elevation relative to one or more of the set of network transmit beams with reported RSSI or RSRP.

In some examples, the UE 115-*b* may transmit a measurement report that indicates one or more network transmit beams from the set of network transmit beams in addition to the one or more candidate network transmit beams in accordance with the one or more power measurements. For example, the UE 115-*b* may indicate one or more of the set of network transmit beams as well as one or more candidate network transmit beams excluded from the set of network transmit beams based on the power measurements (e.g., RSSI measurements, RSRP measurements) performed during the UE beam management procedure. The measurement report transmitted by the UE 115-*b* may indicate that the one or more candidate network transmit beams are directionally quasi-colocated with the one or more network transmit beams of the set of network transmit beams.

In some aspects, the set of network transmit beams may correspond to a first frequency range, and the one or more candidate network transmit beams may correspond to a second frequency range that is different than the first frequency range. For instance, in some examples, the UE 115-*b* may receive the set of reference signals on the set of network transmit beams on FR2, and the UE 115-*b* may indicate one or more candidate network transmit beams on FR4 or FR5. In some such examples, the one or more candidate network transmit beams on FR4 or FR5 may be in the same general direction of the set of network transmit beams on FR2, but with some angular offset. In some examples, beams widths of beams in the first frequency range may be different than beam widths of beams in the second frequency range. For instance, beams in FR2 may be wider than beams in FR4 or FR5.

At 320, the network entity 105-*b* may generate a configuration for communications between the UE 115-*b* and the network entity 105-*b*. At 325, the UE 115-*b* may receive, and the network entity 105-*b* may transmit, a message indicating a configuration for communications with the network entity 105-*b*. The UE 115-*b* may receive the message indicating the configuration in response to transmitting the measurement report. The message indicating the configuration may be received via at least one of a DCI signaling, a MAC-CE signaling, an RRC signaling, or a combination thereof.

In some examples, the configuration may indicate one or more SSBs associated with one or more candidate UE receive beams corresponding to at least one of the one or more candidate network transmit beams that are additional to the set of network transmit beams. For instance, the network entity 105-*b* may indicate the one or more SSBs which have the one or more candidate UE receive beams corresponding to the one or more candidate network transmit beams indicated in the measurement report such that the UE 115-*a* may reduce scanning for potential UE receive beams to the one or more candidate UE receive beams.

In some examples, the UE 115-*b* may receive the message indicating the configuration by receiving an indication of one or more candidate UE receive beams in response to transmitting the measurement report, where at least one of the one or more candidate UE receive beams corresponds to at least one of the one or more candidate network transmit beams that are additional to the set of network transmit beams. For example, the UE 115-*b* may receive an indication from the network entity 105-*b* indicating a candidate UE receive beam corresponding to one of the candidate network transmit beams indicated in the measurement report.

In some examples, the network entity 105-*a* may determine to include the additional beam pair that includes the one or more candidate UE receive beams based on at least on one of one or more reflectors in an environment of the UE 115-*b*, the measurement report that the network entity 105-*b* receives at 315, the set of network transmit beams, or a combination thereof. Accordingly, the network entity 105-*b* may transmit, and the UE 115-*b* may receive, the message indicating the configuration by receiving an indication for the UE 115-*b* to add an additional beam pair that includes one or more candidate UE receive beams corresponding to at least one of the one or more candidate network transmit beams that are additional to the set of network transmit beams.

At 330, the UE 115-*b* may communicate with the network entity 105-*b*. For example, the UE 115-*b* may monitor one or more candidate UE receive beams indicated by the message received at 325 to receive transmissions from the network entity 105-*b*. Additionally, or alternatively, the UE 115-*b* may utilize the additional beam pair indicated by the message received at 325 to communicate with the network entity 105-*b*.

In some examples, the one or more candidate network transmit beams indicated in the measurement report at 315 may be utilized for a beam failure recovery procedure. For example, the UE 115-*b* may identify a beam failure for at least one of the set of network transmit beams. Additionally, or alternatively, the UE 115-*b* may receive a set of resources for a beam failure recovery procedure, where the set of resources includes at least one of the one or more candidate network transmit beams that are additional to the set of network transmit beams.

Figure 4:
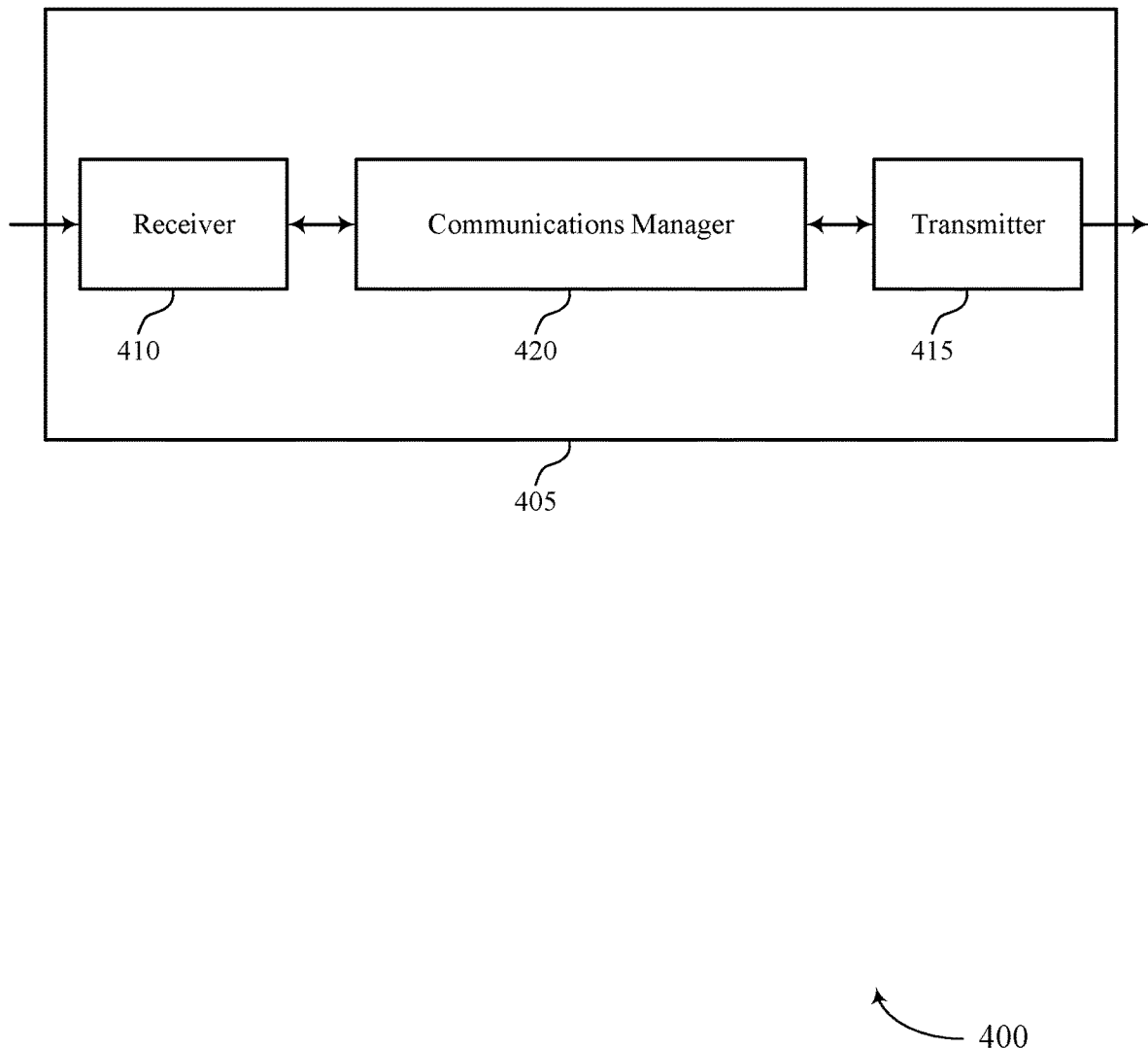
FIGS. 4 and 5 show block diagrams of devices that support beam measurement reporting for spatially offset beams in accordance with one or more aspects of the present disclosure.

FIG. 4 shows a block diagram 400 of a device 405 that supports beam measurement reporting for spatially offset beams in accordance with one or more aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to beam measurement reporting for spatially offset beams). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to beam measurement reporting for spatially offset beams). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of beam measurement reporting for spatially offset beams as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication at a UE in accordance with examples as disclosed herein. For example, the communications manager 420 may be configured as or otherwise support a means for receiving a set of reference signals for a UE beam measurement procedure for measuring a set of multiple network transmit beams corresponding to the set of reference signals for communications between a network entity and the UE. The communications manager 420 may be configured as or otherwise support a means for transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications manager 420 may be configured as or otherwise support a means for receiving a message indicating a configuration for communications with the network entity in response to transmitting the measurement report.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power consumption, and more efficient utilization of communication resources.

Figure 5:
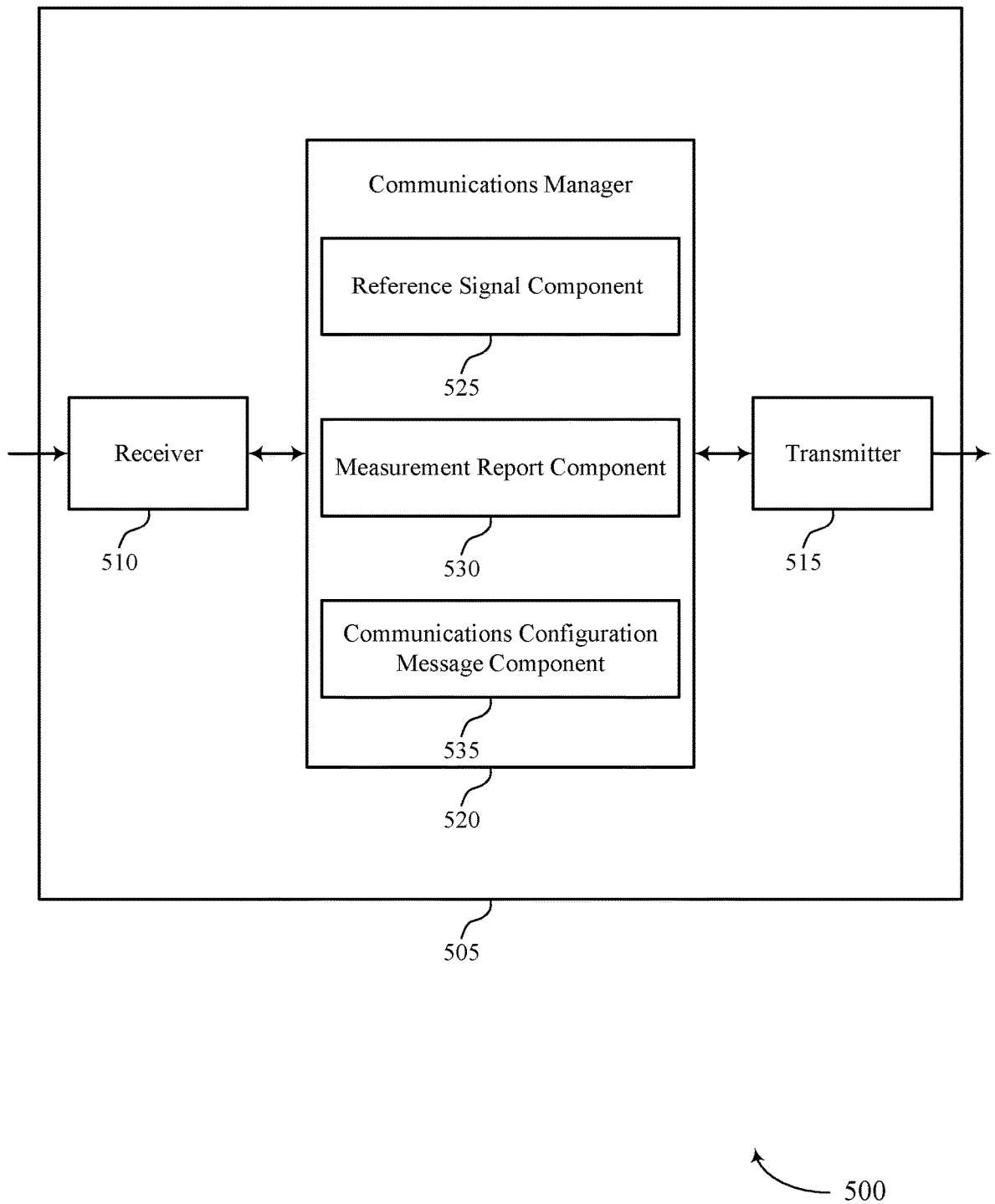

FIG. 5 shows a block diagram 500 of a device 505 that supports beam measurement reporting for spatially offset beams in accordance with one or more aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to beam measurement reporting for spatially offset beams). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to beam measurement reporting for spatially offset beams). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of beam measurement reporting for spatially offset beams as described herein. For example, the communications manager 520 may include a reference signal component 525, a measurement report component 530, a communications configuration message component 535, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a UE in accordance with examples as disclosed herein. The reference signal component 525 may be configured as or otherwise support a means for receiving a set of reference signals for a UE beam measurement procedure for measuring a set of multiple network transmit beams corresponding to the set of reference signals for communications between a network entity and the UE. The measurement report component 530 may be configured as or otherwise support a means for transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications configuration message component 535 may be configured as or otherwise support a means for receiving a message indicating a configuration for communications with the network entity in response to transmitting the measurement report.

Figure 6:
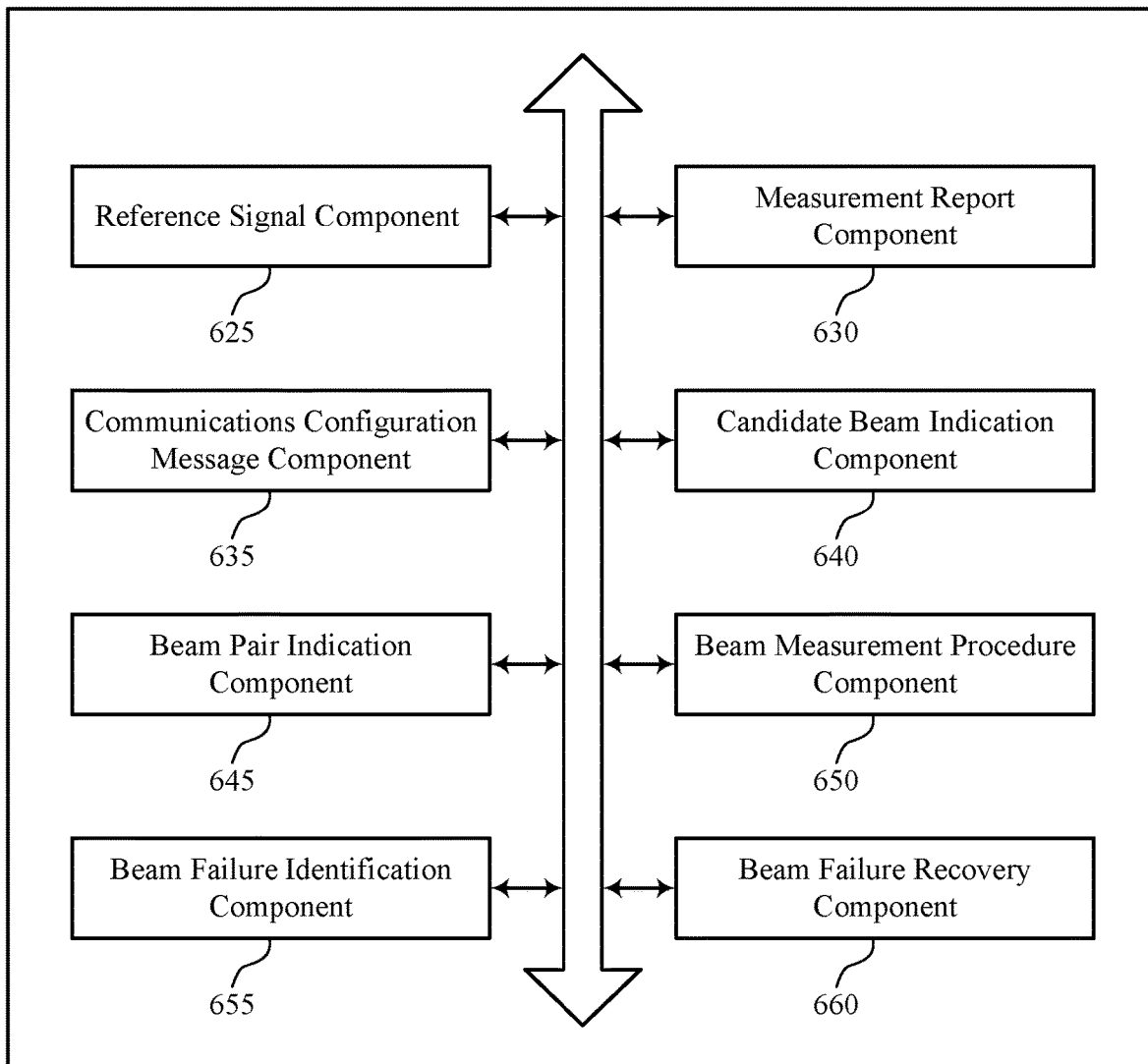
FIG. 6 shows a block diagram of a communications manager that supports beam measurement reporting for spatially offset beams in accordance with one or more aspects of the present disclosure.

FIG. 6 shows a block diagram 600 of a communications manager 620 that supports beam measurement reporting for spatially offset beams in accordance with one or more aspects of the present disclosure. The communications manager 620 may be an example of aspects of a communications manager 420, a communications manager 520, or both, as described herein. The communications manager 620, or various components thereof, may be an example of means for performing various aspects of beam measurement reporting for spatially offset beams as described herein. For example, the communications manager 620 may include a reference signal component 625, a measurement report component 630, a communications configuration message component 635, a candidate beam indication component 640, a beam pair indication component 645, a beam measurement procedure component 650, a beam failure identification component 655, a beam failure recovery component 660, or any combination thereof. Each of these components may communicate, directly or indirectly, with one another (e.g., via one or more buses).

The communications manager 620 may support wireless communication at a UE in accordance with examples as disclosed herein. The reference signal component 625 may be configured as or otherwise support a means for receiving a set of reference signals for a UE beam measurement procedure for measuring a set of multiple network transmit beams corresponding to the set of reference signals for communications between a network entity and the UE. The measurement report component 630 may be configured as or otherwise support a means for transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications configuration message component 635 may be configured as or otherwise support a means for receiving a message indicating a configuration for communications with the network entity in response to transmitting the measurement report.

In some examples, the measurement report indicates that the one or more candidate network transmit beams are directionally quasi-colocated with the one or more network transmit beams of the set of multiple network transmit beams.

In some examples, the set of multiple network transmit beams correspond to a first frequency range and the one or more candidate network transmit beams correspond to a second frequency range that is different than the first frequency range. In some examples, beam widths of beams in the first frequency range are different than beam widths of beams in the second frequency range.

In some examples, to support receiving the message indicating the configuration, the candidate beam indication component 640 may be configured as or otherwise support a means for receiving an indication of one or more candidate UE receive beams in response to transmitting the measurement report, where at least one of the one or more candidate UE receive beams corresponds to at least one of the one or more candidate network transmit beams that are additional to the set of multiple network transmit beams.

In some examples, to support receiving the message indicating the configuration, the beam pair indication component 645 may be configured as or otherwise support a means for receiving an indication for the UE to add an additional beam pair including one or more candidate UE receive beams corresponding to at least one of the one or more candidate network transmit beams that are additional to the set of multiple network transmit beams.

In some examples, the indication for the UE to add the additional beam pair is based on at least one of one or more reflectors in an environment of the UE, the measurement report, the set of multiple network transmit beams, or a combination thereof.

In some examples, the configuration indicates one or more synchronization signal blocks associated with one or more candidate UE receive beams corresponding to at least one of the one or more candidate network transmit beams that are additional to the set of multiple network transmit beams.

In some examples, the beam measurement procedure component 650 may be configured as or otherwise support a means for performing the UE beam measurement procedure to measure the set of reference signals on the set of multiple network transmit beams to identify one or more power measurements associated with the set of multiple network transmit beams, where transmitting the measurement report includes transmitting the measurement report indicating one or more network transmit beams from the set of multiple network transmit beams in addition to the one or more candidate network transmit beams in accordance with the one or more power measurements.

In some examples, the beam failure identification component 655 may be configured as or otherwise support a means for identifying a beam failure for at least one of the set of multiple network transmit beams. In some examples, the beam failure recovery component 660 may be configured as or otherwise support a means for receiving a set of resources for a beam failure recovery procedure, where the set of resources includes at least one of the one or more candidate network transmit beams that are additional to the set of multiple network transmit beams.

In some examples, the configuration is received via at least one of a DCI signaling, a MAC-CE signaling, an RRC signaling, or a combination thereof. In some examples, the measurement report is transmitted via at least one of a MAC-CE signaling, an RRC signaling, or both.

Figure 7:
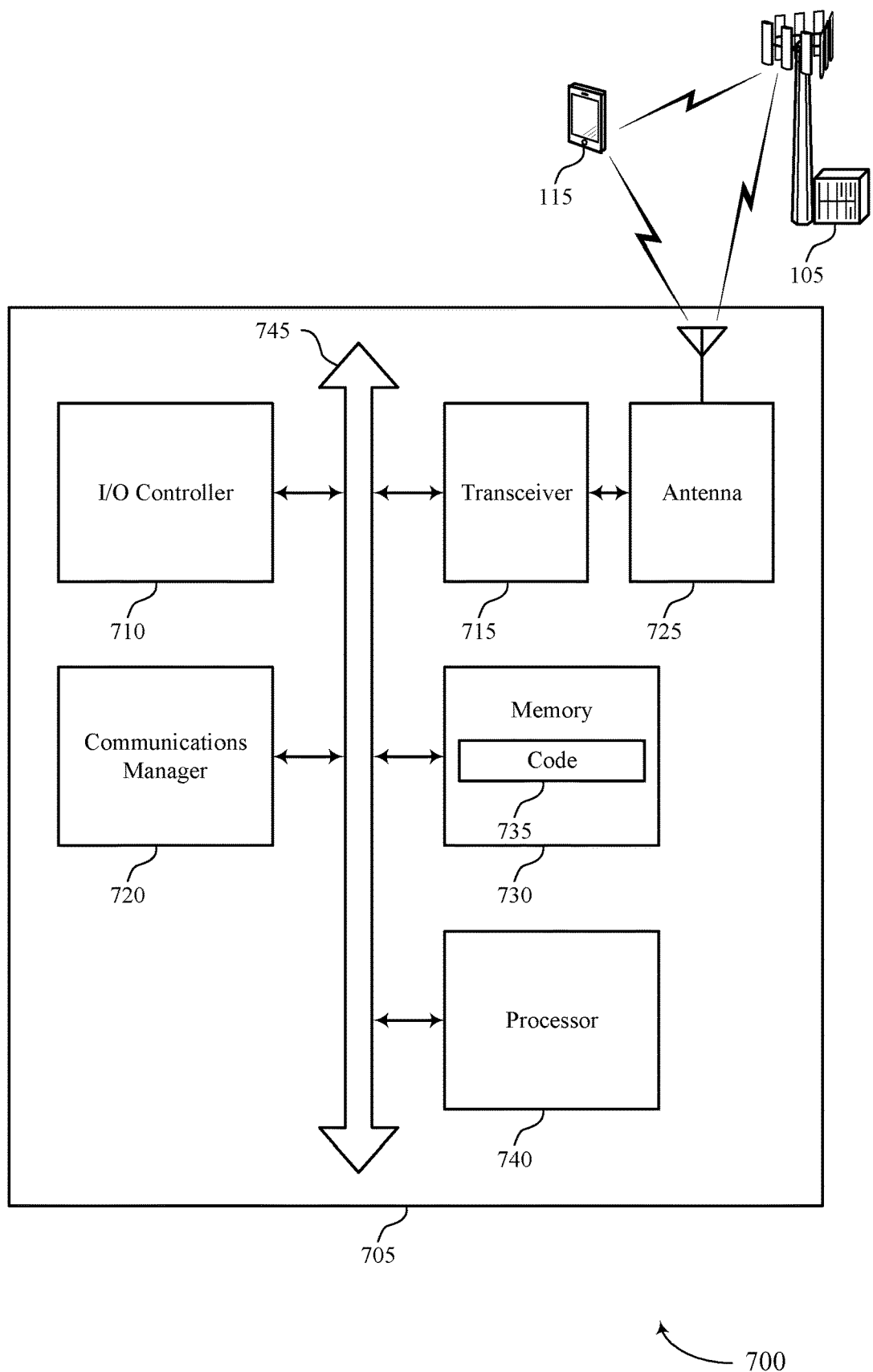
FIG. 7 shows a diagram of a system including a device that supports beam measurement reporting for spatially offset beams in accordance with one or more aspects of the present disclosure.

FIG. 7 shows a diagram of a system 700 including a device 705 that supports beam measurement reporting for spatially offset beams in accordance with one or more aspects of the present disclosure. The device 705 may be an example of or include the components of a device 405, a device 505, or a UE 115 as described herein. The device 705 may communicate (e.g., wirelessly) with one or more network entities 105, one or more UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting beam measurement reporting for spatially offset beams). For example, the device 705 or a component of the device 705 may include a processor 740 and memory 730 coupled with or to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving a set of reference signals for a UE beam measurement procedure for measuring a set of multiple network transmit beams corresponding to the set of reference signals for communications between a network entity and the UE. The communications manager 720 may be configured as or otherwise support a means for transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications manager 720 may be configured as or otherwise support a means for receiving a message indicating a configuration for communications with the network entity in response to transmitting the measurement report.

By including or configuring the communications manager 720 in accordance with examples as described herein, the device 705 may support techniques for reduced latency, improved user experience related to reduced processing, reduced power consumption, more efficient utilization of communication resources, longer battery life, and improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of beam measurement reporting for spatially offset beams as described herein, or the processor 740 and the memory 730 may be otherwise configured to perform or support such operations.

Figure 8:
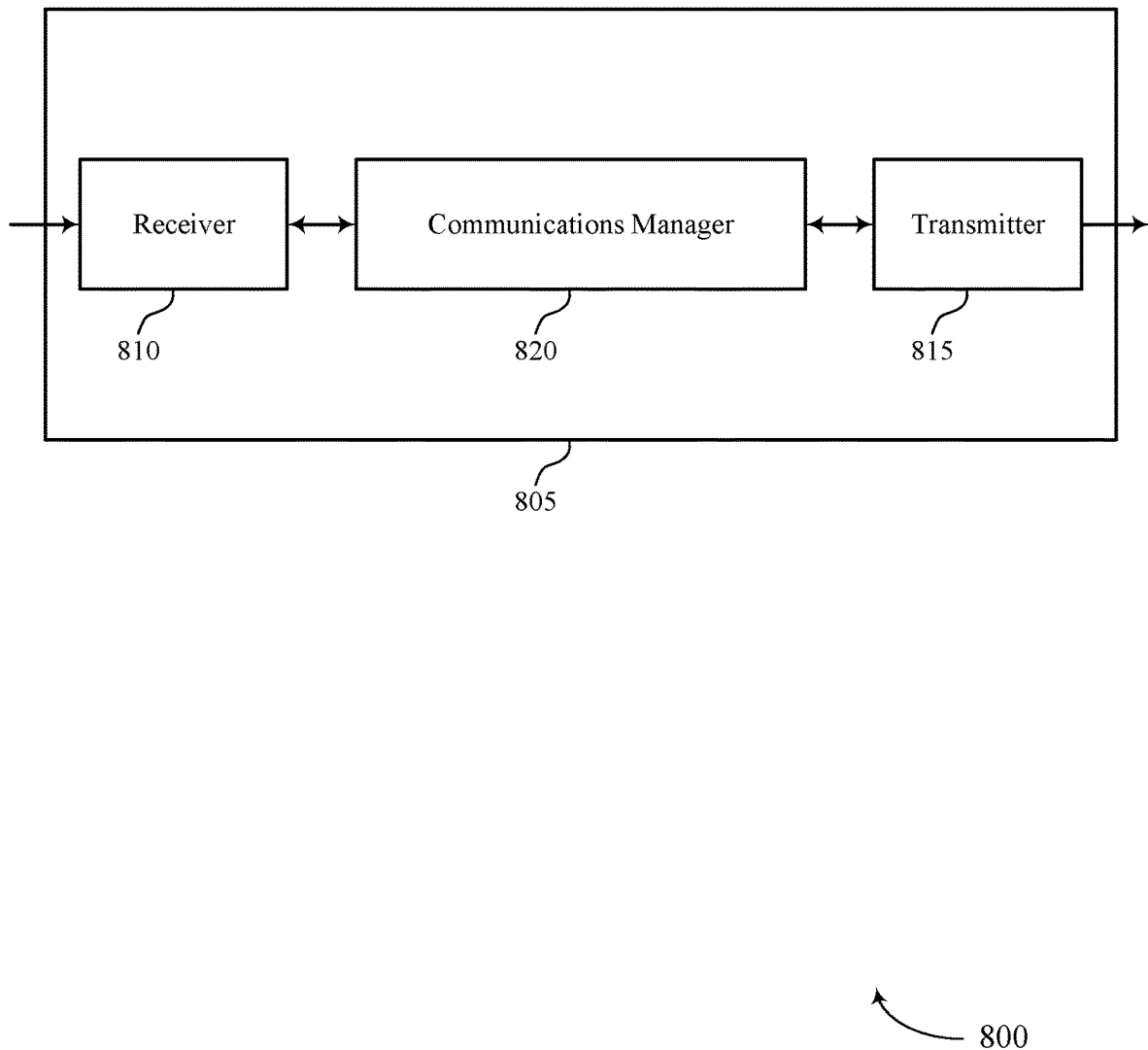
FIGS. 8 and 9 show block diagrams of devices that support beam measurement reporting for spatially offset beams in accordance with one or more aspects of the present disclosure.

FIG. 8 shows a block diagram 800 of a device 805 that supports beam measurement reporting for spatially offset beams in accordance with one or more aspects of the present disclosure. The device 805 may be an example of aspects of a network entity 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations thereof or various components thereof may be examples of means for performing various aspects of beam measurement reporting for spatially offset beams as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a network entity in accordance with examples as disclosed herein. For example, the communications manager 820 may be configured as or otherwise support a means for transmitting a set of reference signals for a UE beam measurement procedure for measuring a set of multiple network transmit beams corresponding to the set of reference signals for communications between the network entity and a UE. The communications manager 820 may be configured as or otherwise support a means for receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications manager 820 may be configured as or otherwise support a means for transmitting a message indicating a configuration for communications with the network entity in response to receiving the measurement report.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for reduced processing, reduced power consumption, and more efficient utilization of communication resources.

Figure 9:
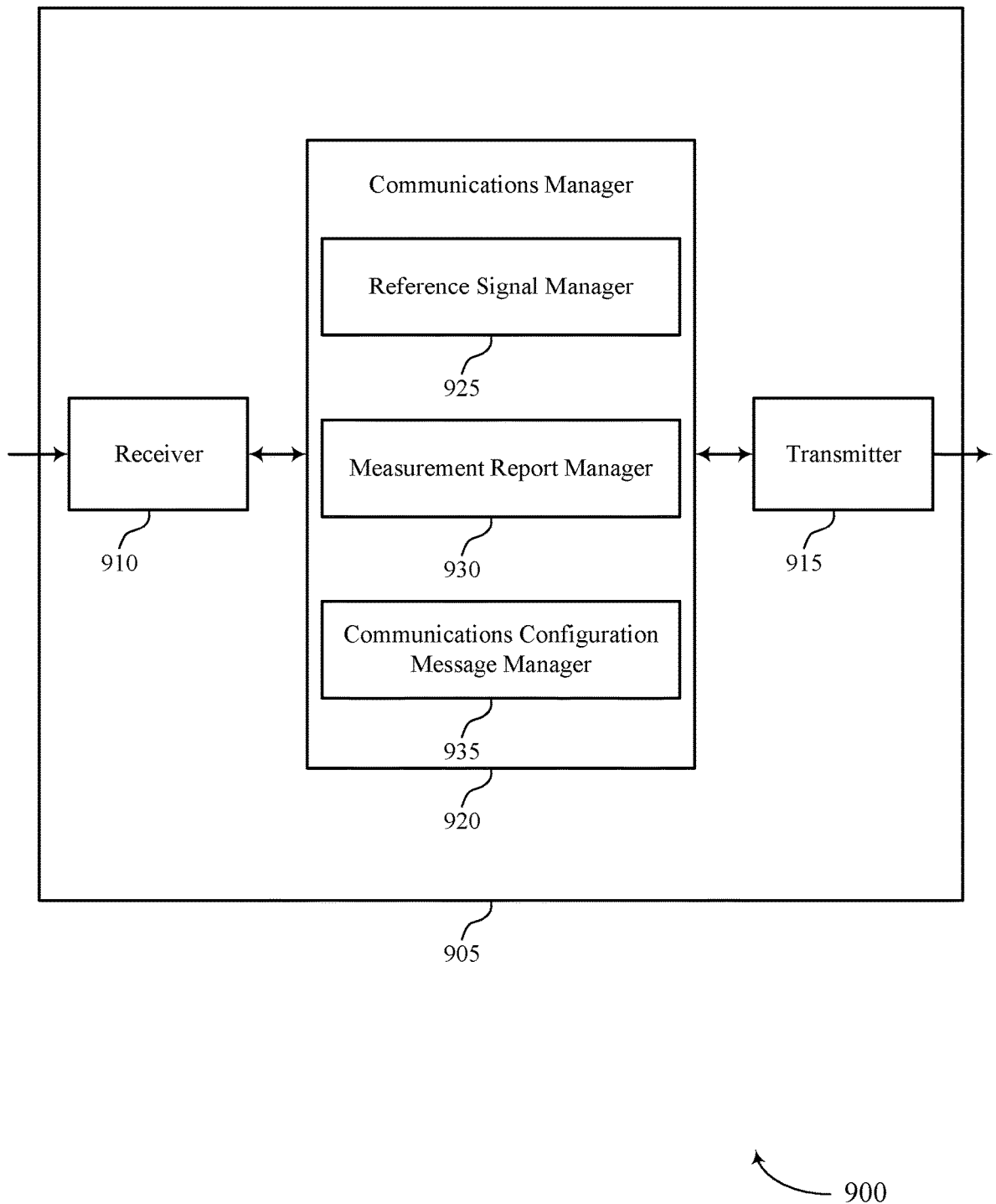

FIG. 9 shows a block diagram 900 of a device 905 that supports beam measurement reporting for spatially offset beams in accordance with one or more aspects of the present disclosure. The device 905 may be an example of aspects of a device 805 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of beam measurement reporting for spatially offset beams as described herein. For example, the communications manager 920 may include a reference signal manager 925, a measurement report manager 930, a communications configuration message manager 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a network entity in accordance with examples as disclosed herein. The reference signal manager 925 may be configured as or otherwise support a means for transmitting a set of reference signals for a UE beam measurement procedure for measuring a set of multiple network transmit beams corresponding to the set of reference signals for communications between the network entity and a UE. The measurement report manager 930 may be configured as or otherwise support a means for receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications configuration message manager 935 may be configured as or otherwise support a means for transmitting a message indicating a configuration for communications with the network entity in response to receiving the measurement report.

Figure 10:
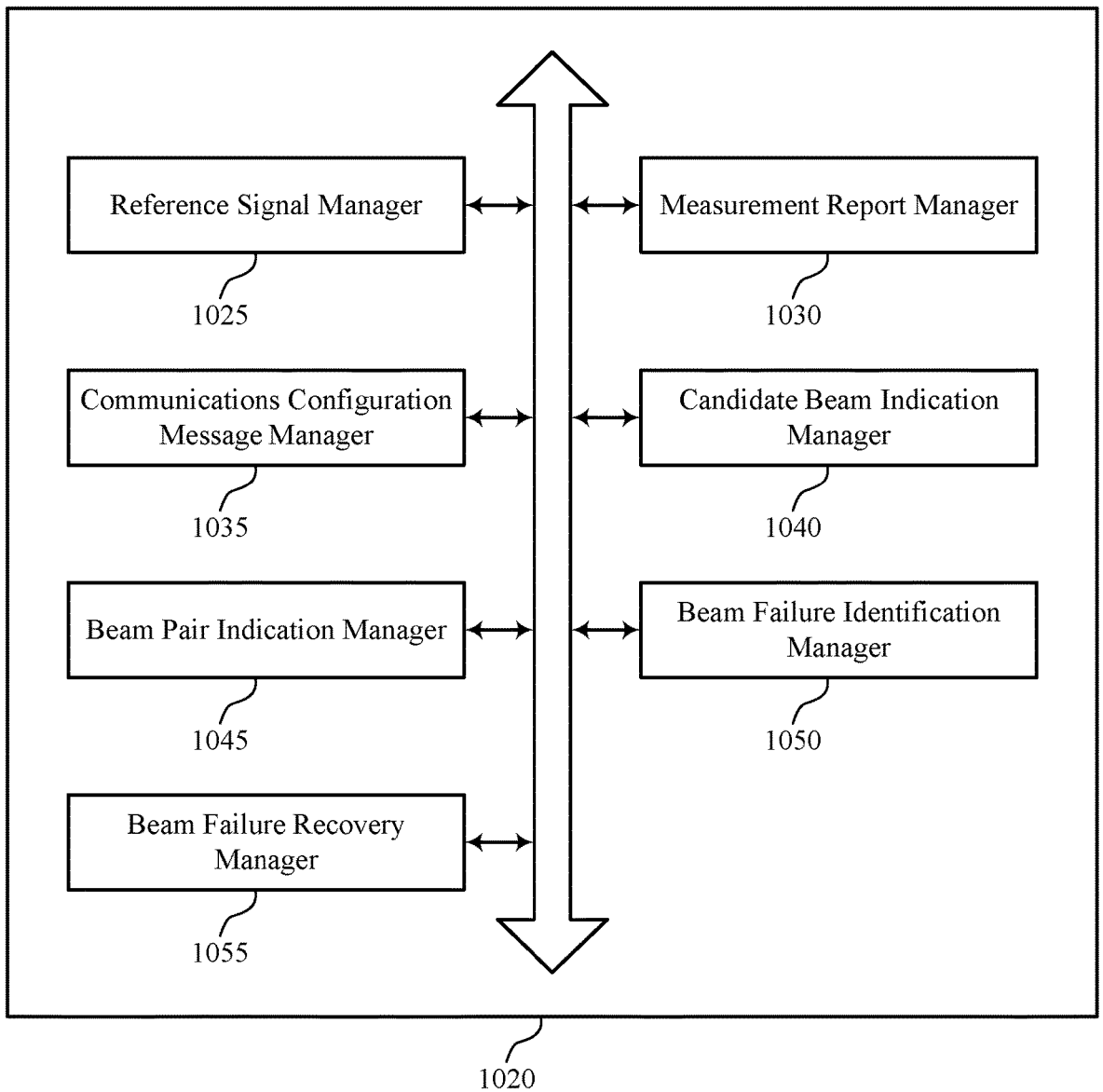
FIG. 10 shows a block diagram of a communications manager that supports beam measurement reporting for spatially offset beams in accordance with one or more aspects of the present disclosure.

FIG. 10 shows a block diagram 1000 of a communications manager 1020 that supports beam measurement reporting for spatially offset beams in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of beam measurement reporting for spatially offset beams as described herein. For example, the communications manager 1020 may include a reference signal manager 1025, a measurement report manager 1030, a communications configuration message manager 1035, a candidate beam indication manager 1040, a beam pair indication manager 1045, a beam failure identification manager 1050, a beam failure recovery manager 1055, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication at a network entity in accordance with examples as disclosed herein. The reference signal manager 1025 may be configured as or otherwise support a means for transmitting a set of reference signals for a UE beam measurement procedure for measuring a set of multiple network transmit beams corresponding to the set of reference signals for communications between the network entity and a UE. The measurement report manager 1030 may be configured as or otherwise support a means for receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications configuration message manager 1035 may be configured as or otherwise support a means for transmitting a message indicating a configuration for communications with the network entity in response to receiving the measurement report.

In some examples, the measurement report indicates that the one or more candidate network transmit beams are directionally quasi-colocated with the one or more network transmit beams of the set of multiple network transmit beams.

In some examples, the set of multiple network transmit beams correspond to a first frequency range and the one or more candidate network transmit beams correspond to a second frequency range that is different than the first frequency range. In some examples, beam widths of beams in the first frequency range are different than beam widths of beams in the second frequency range.

In some examples, to support transmitting the message indicating the configuration, the candidate beam indication manager 1040 may be configured as or otherwise support a means for transmitting an indication of one or more candidate UE receive beams in response to receiving the measurement report, where at least one of the one or more candidate UE receive beams corresponds to at least one of the one or more candidate network transmit beams that are additional to the set of multiple network transmit beams.

In some examples, to support transmitting the message indicating the configuration, the beam pair indication manager 1045 may be configured as or otherwise support a means for transmitting an indication for the UE to add an additional beam pair including one or more candidate UE receive beams corresponding to at least one of the one or more candidate network transmit beams that are additional to the set of multiple network transmit beams.

In some examples, the beam pair indication manager 1045 may be configured as or otherwise support a means for determining to include the additional beam pair including one or more candidate receive beams in the configuration based on one of one or more reflectors in an environment of the UE, the measurement report, the set of multiple network transmit beams, or a combination thereof, where the indication for the UE to add the additional beam pair is based on the determining.

In some examples, the configuration indicates one or more synchronization signal blocks associated with one or more candidate UE receive beams corresponding to at least one of the one or more candidate network transmit beams that are additional to the set of multiple network transmit beams.

In some examples, to support receiving the measurement report, the measurement report manager 1030 may be configured as or otherwise support a means for receiving the measurement report indicating one or more network transmit beams from the set of multiple network transmit beams in addition to the one or more candidate network transmit beams in accordance with one or more power measurements at the UE.

In some examples, the beam failure identification manager 1050 may be configured as or otherwise support a means for identifying a beam failure for at least one of the set of multiple network transmit beams. In some examples, the beam failure recovery manager 1055 may be configured as or otherwise support a means for transmitting a set of resources for a beam failure recovery procedure, where the set of resources includes at least one of the one or more candidate network transmit beams that are additional to the set of multiple network transmit beams.

In some examples, the configuration is transmitted via at least one of a DCI signaling, a medium access control (MAC) control element (MAC-CE) signaling, an RRC signaling, or a combination thereof.

In some examples, the measurement report is received via a medium access control (MAC) control element (MAC-CE) signaling, an RRC signaling, or both.

Figure 11:
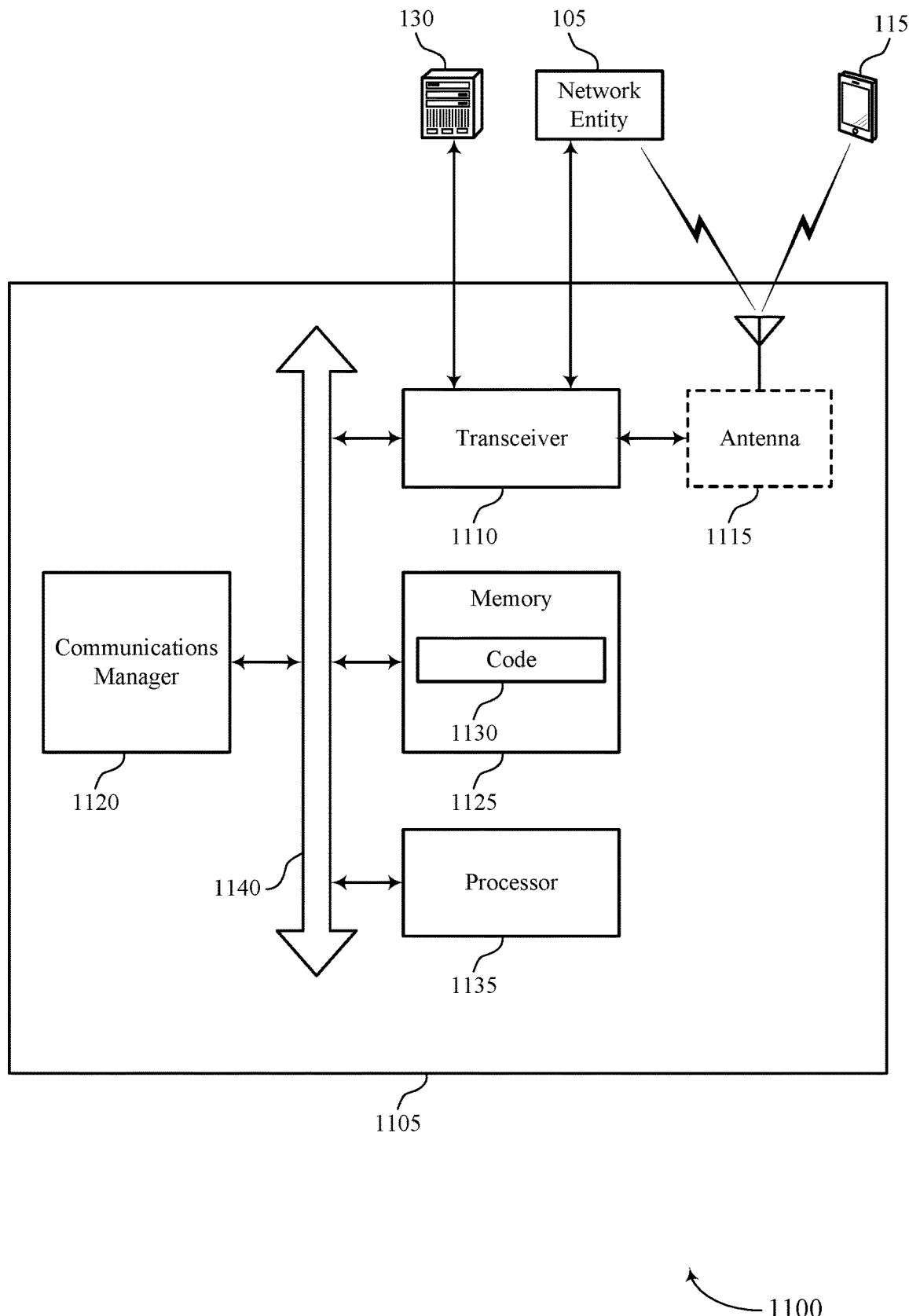
FIG. 11 shows a diagram of a system including a device that supports beam measurement reporting for spatially offset beams in accordance with one or more aspects of the present disclosure.

FIG. 11 shows a diagram of a system 1100 including a device 1105 that supports beam measurement reporting for spatially offset beams in accordance with one or more aspects of the present disclosure. The device 1105 may be an example of or include the components of a device 805, a device 905, or a network entity 105 as described herein. The device 1105 may communicate with one or more network entities 105, one or more UEs 115, or any combination thereof, which may include communications over one or more wired interfaces, over one or more wireless interfaces, or any combination thereof. The device 1105 may include components that support outputting and obtaining communications, such as a communications manager 1120, a transceiver 1110, an antenna 1115, a memory 1125, code 1130, and a processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or memory components (for example, the processor 1135, or the memory 1125, or both), may be included in a chip or chip assembly that is installed in the device 1105. The transceiver 1110, or the transceiver 1110 and one or more antennas 1115 or wired interfaces, where applicable, may be an example of a transmitter 815, a transmitter 915, a receiver 810, a receiver 910, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1125 may include RAM and ROM. The memory 1125 may store computer-readable, computer-executable code 1130 including instructions that, when executed by the processor 1135, cause the device 1105 to perform various functions described herein. The code 1130 may be stored in a non-transitory computer-readable medium such as system memory or another type of memory. In some cases, the code 1130 may not be directly executable by the processor 1135 but may cause a computer (e.g., when compiled and executed) to perform functions described herein. In some cases, the memory 1125 may contain, among other things, a BIOS which may control basic hardware or software operation such as the interaction with peripheral components or devices.

The processor 1135 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1135 may be configured to operate a memory array using a memory controller. In some other cases, a memory controller may be integrated into the processor 1135. The processor 1135 may be configured to execute computer-readable instructions stored in a memory (e.g., the memory 1125) to cause the device 1105 to perform various functions (e.g., functions or tasks supporting beam measurement reporting for spatially offset beams). For example, the device 1105 or a component of the device 1105 may include a processor 1135 and memory 1125 coupled with the processor 1135, the processor 1135 and memory 1125 configured to perform various functions described herein. The processor 1135 may be an example of a cloud-computing platform (e.g., one or more physical nodes and supporting software such as operating systems, virtual machines, or container instances) that may host the functions (e.g., by executing code 1130) to perform the functions of the device 1105. The processor 1135 may be any one or more suitable processors capable of executing scripts or instructions of one or more software programs stored in the device 1105 (such as within the memory 1125). In some implementations, the processor 1135 may be a component of a processing system. A processing system may generally refer to a system or series of machines or components that receives inputs and processes the inputs to produce a set of outputs (which may be passed to other systems or components of, for example, the device 1105). For example, a processing system of the device 1105 may refer to a system including the various other components or subcomponents of the device 1105, such as the processor 1135, or the transceiver 1110, or the communications manager 1120, or other components or combinations of components of the device 1105. The processing system of the device 1105 may interface with other components of the device 1105, and may process information received from other components (such as inputs or signals) or output information to other components. For example, a chip or modem of the device 1105 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1105 may transmit information output from the chip or modem. In some implementations, the second interface may refer to an interface between the processing system of the chip or modem and a receiver, such that the device 1105 may obtain information or signal inputs, and the information may be passed to the processing system. A person having ordinary skill in the art will readily recognize that the first interface also may obtain information or signal inputs, and the second interface also may output information or signal outputs.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the memory 1125, the code 1130, and the processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with other network entities 105, and may include a controller or scheduler for controlling communications with UEs 115 in cooperation with other network entities 105. In some examples, the communications manager 1120 may support an X2 interface within an LTE/LTE-A wireless communications network technology to provide communication between network entities 105.

The communications manager 1120 may support wireless communication at a network entity in accordance with examples as disclosed herein. For example, the communications manager 1120 may be configured as or otherwise support a means for transmitting a set of reference signals for a UE beam measurement procedure for measuring a set of multiple network transmit beams corresponding to the set of reference signals for communications between the network entity and a UE. The communications manager 1120 may be configured as or otherwise support a means for receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The communications manager 1120 may be configured as or otherwise support a means for transmitting a message indicating a configuration for communications with the network entity in response to receiving the measurement report.

By including or configuring the communications manager 1120 in accordance with examples as described herein, the device 1105 may support techniques for reduced latency, improved user experience related to reduced processing, reduced power consumption, more efficient utilization of communication resources, longer battery life, and improved utilization of processing capability.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the processor 1135, the memory 1125, the code 1130, the transceiver 1110, or any combination thereof. For example, the code 1130 may include instructions executable by the processor 1135 to cause the device 1105 to perform various aspects of beam measurement reporting for spatially offset beams as described herein, or the processor 1135 and the memory 1125 may be otherwise configured to perform or support such operations.

Figure 12:
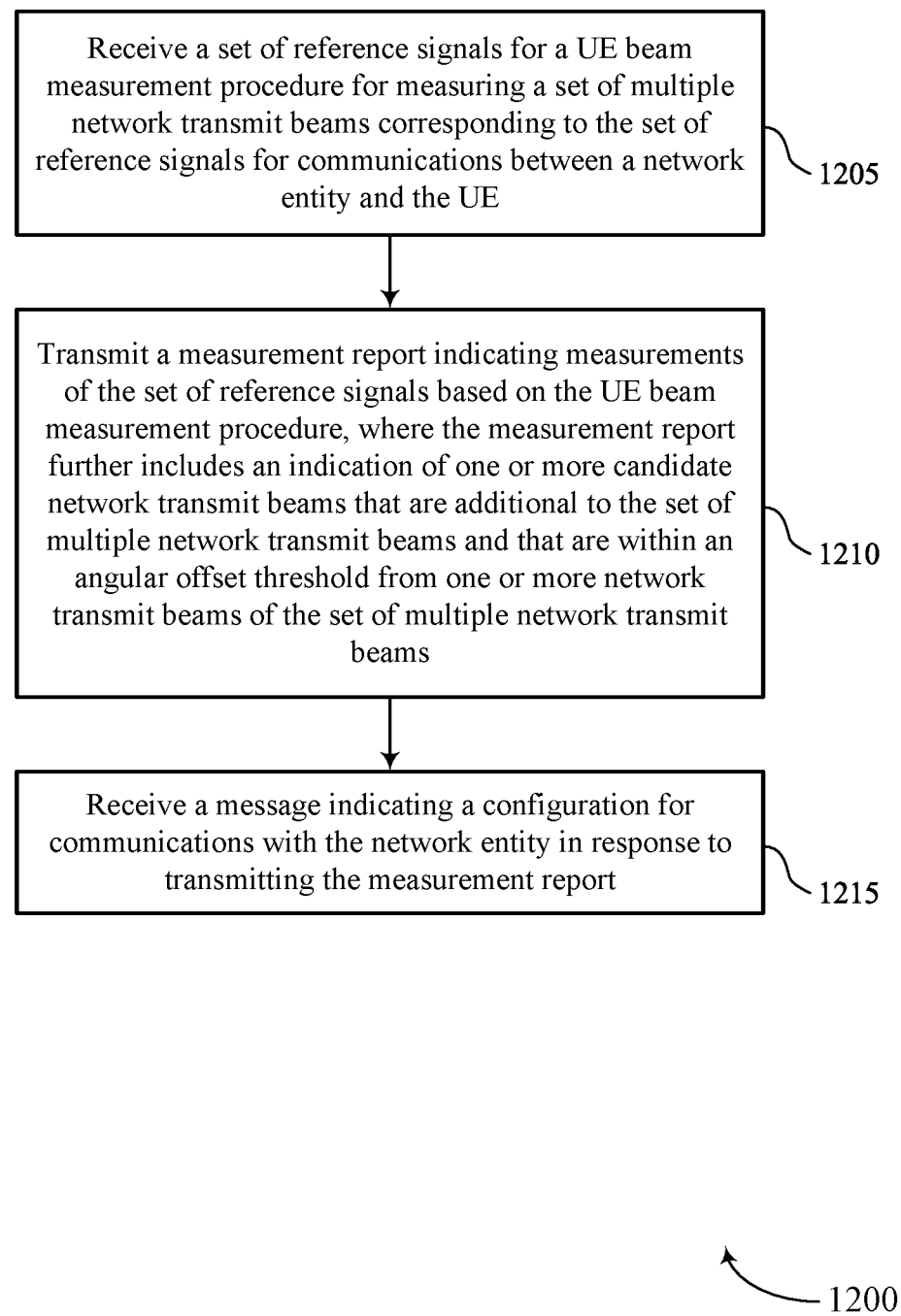
FIGS. 12 through 16 show flowcharts illustrating methods that support beam measurement reporting for spatially offset beams in accordance with one or more aspects of the present disclosure.

FIG. 12 shows a flowchart illustrating a method 1200 that supports beam measurement reporting for spatially offset beams in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include receiving a set of reference signals for a UE beam measurement procedure for measuring a set of multiple network transmit beams corresponding to the set of reference signals for communications between a network entity and the UE. The operations of 1205 may be performed in accordance with examples as disclosed herein. In some examples, aspects of the operations of 1205 may be performed by a reference signal component 625 as described with reference to FIG. 6.

At 1210, the method may include transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The operations of 1210 may be performed in accordance with examples as disclosed herein. In some examples, aspects of the operations of 1210 may be performed by a measurement report component 630 as described with reference to FIG. 6.

At 1215, the method may include receiving a message indicating a configuration for communications with the network entity in response to transmitting the measurement report. The operations of 1215 may be performed in accordance with examples as disclosed herein. In some examples, aspects of the operations of 1215 may be performed by a communications configuration message component 635 as described with reference to FIG. 6.

Figure 13:
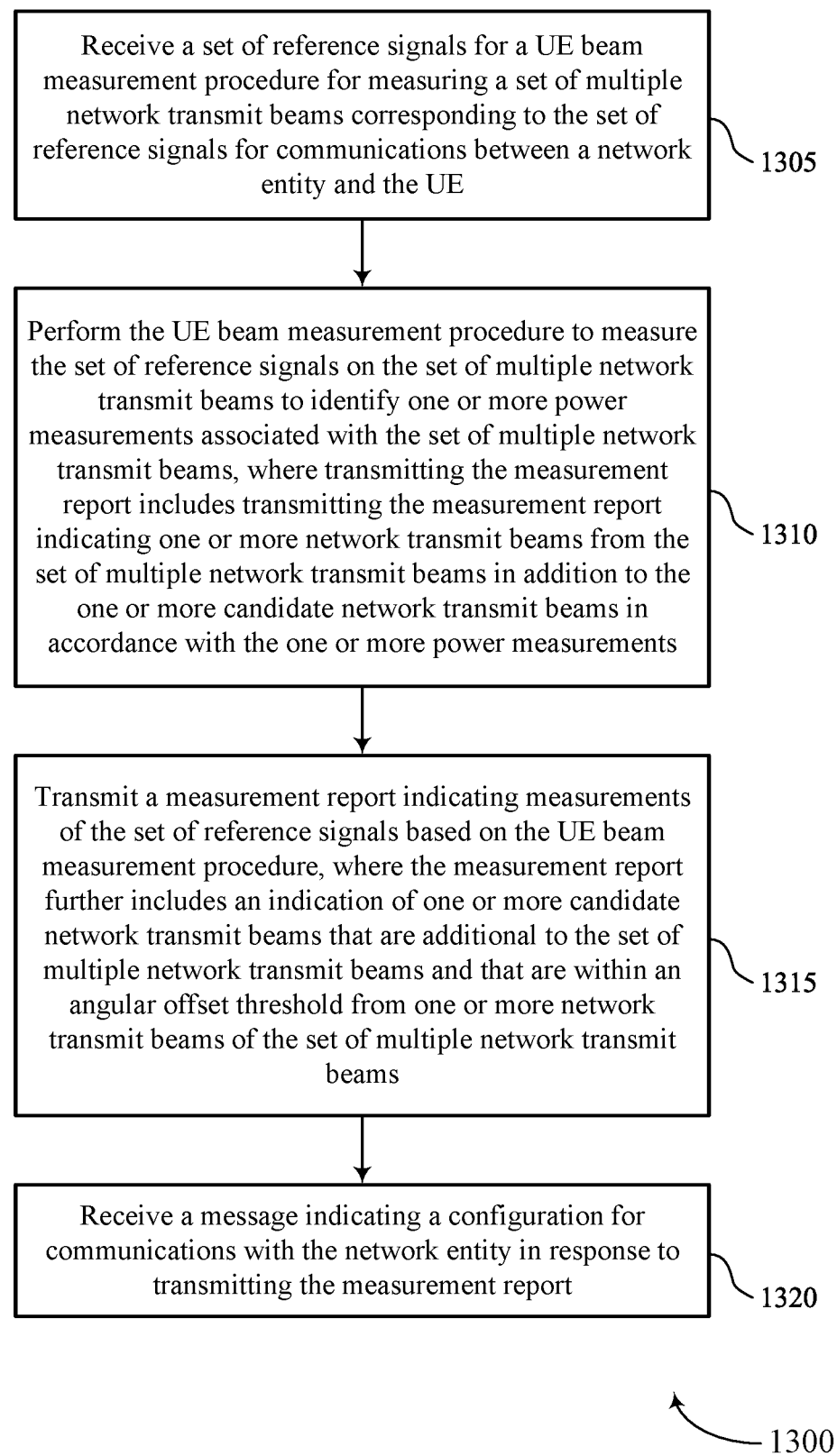

FIG. 13 shows a flowchart illustrating a method 1300 that supports beam measurement reporting for spatially offset beams in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include receiving a set of reference signals for a UE beam measurement procedure for measuring a set of multiple network transmit beams corresponding to the set of reference signals for communications between a network entity and the UE. The operations of 1305 may be performed in accordance with examples as disclosed herein. In some examples, aspects of the operations of 1305 may be performed by a reference signal component 625 as described with reference to FIG. 6.

At 1310, the method may include performing the UE beam measurement procedure to measure the set of reference signals on the set of multiple network transmit beams to identify one or more power measurements associated with the set of multiple network transmit beams, where transmitting the measurement report includes transmitting the measurement report indicating one or more network transmit beams from the set of multiple network transmit beams in addition to the one or more candidate network transmit beams in accordance with the one or more power measurements. The operations of 1310 may be performed in accordance with examples as disclosed herein. In some examples, aspects of the operations of 1310 may be performed by a beam measurement procedure component 650 as described with reference to FIG. 6.

At 1315, the method may include transmitting a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The operations of 1315 may be performed in accordance with examples as disclosed herein. In some examples, aspects of the operations of 1315 may be performed by a measurement report component 630 as described with reference to FIG. 6.

At 1320, the method may include receiving a message indicating a configuration for communications with the network entity in response to transmitting the measurement report. The operations of 1320 may be performed in accordance with examples as disclosed herein. In some examples, aspects of the operations of 1320 may be performed by a communications configuration message component 635 as described with reference to FIG. 6.

Figure 14:
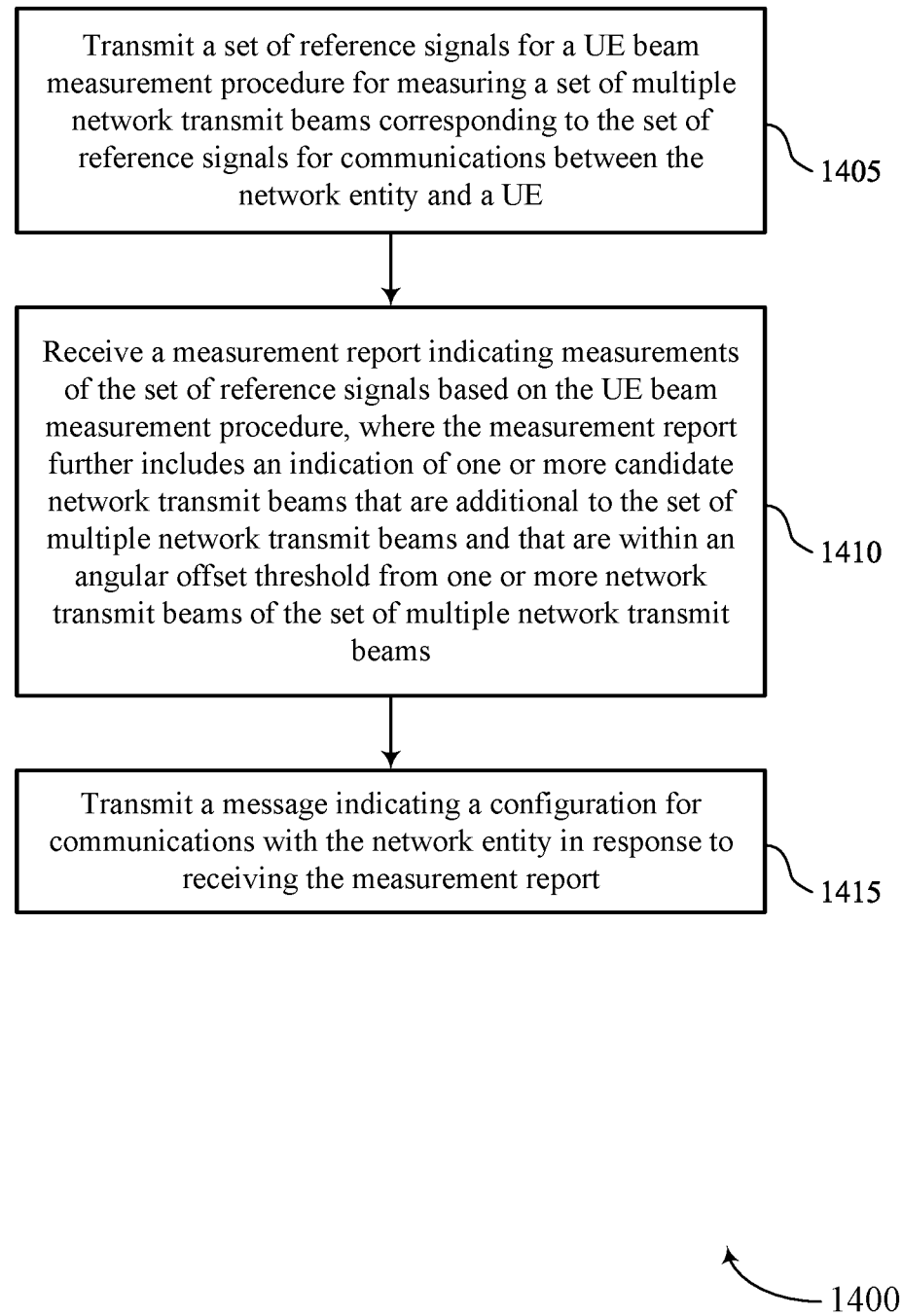

FIG. 14 shows a flowchart illustrating a method 1400 that supports beam measurement reporting for spatially offset beams in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include transmitting a set of reference signals for a UE beam measurement procedure for measuring a set of multiple network transmit beams corresponding to the set of reference signals for communications between the network entity and a UE. The operations of 1405 may be performed in accordance with examples as disclosed herein. In some examples, aspects of the operations of 1405 may be performed by a reference signal manager 1025 as described with reference to FIG. 10.

At 1410, the method may include receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The operations of 1410 may be performed in accordance with examples as disclosed herein. In some examples, aspects of the operations of 1410 may be performed by a measurement report manager 1030 as described with reference to FIG. 10.

At 1415, the method may include transmitting a message indicating a configuration for communications with the network entity in response to receiving the measurement report. The operations of 1415 may be performed in accordance with examples as disclosed herein. In some examples, aspects of the operations of 1415 may be performed by a communications configuration message manager 1035 as described with reference to FIG. 10.

Figure 15:
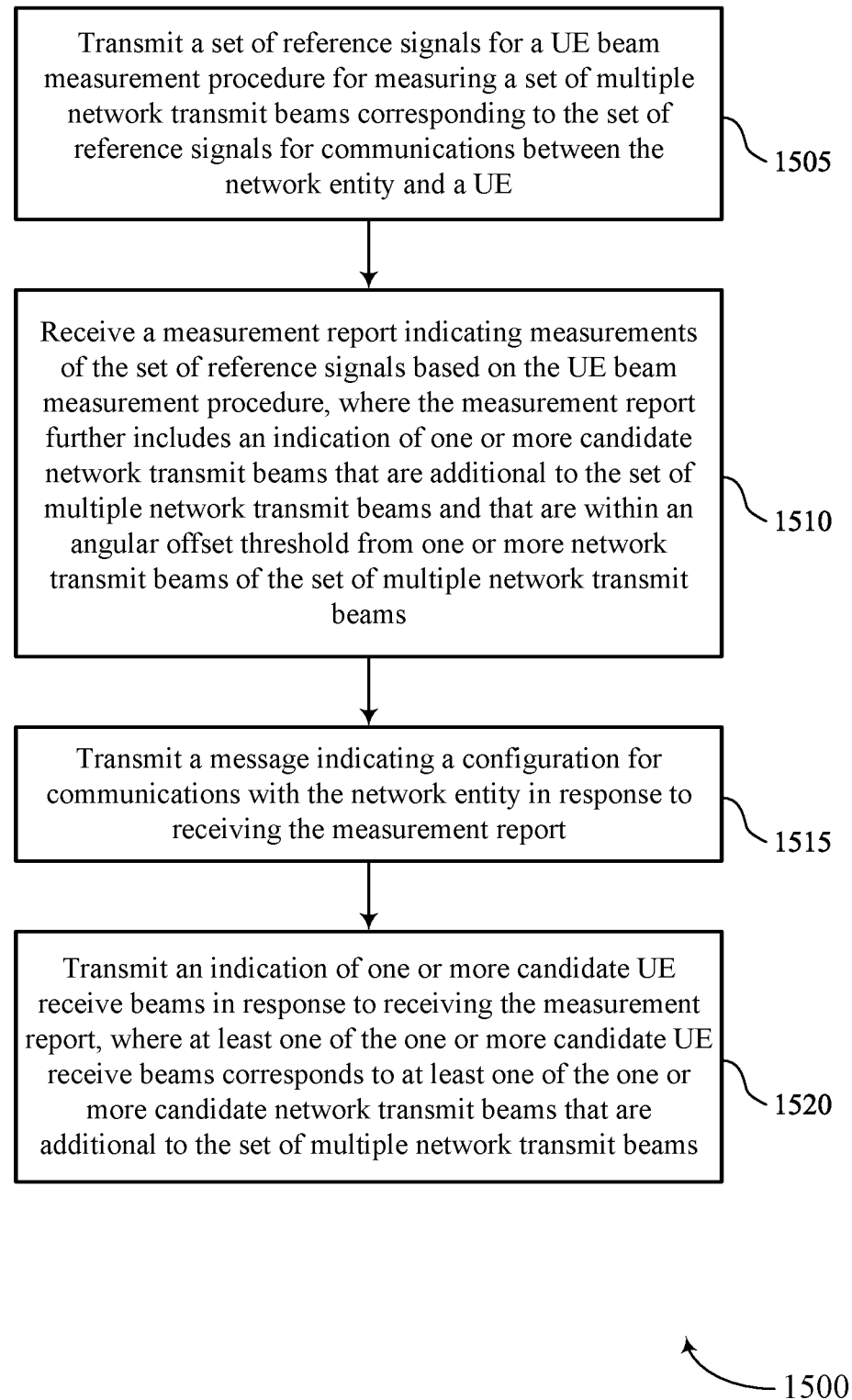

FIG. 15 shows a flowchart illustrating a method 1500 that supports beam measurement reporting for spatially offset beams in accordance with one or more aspects of the present disclosure. The operations of the method 1500 may be implemented by a network entity or its components as described herein. For example, the operations of the method 1500 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a set of reference signals for a UE beam measurement procedure for measuring a set of multiple network transmit beams corresponding to the set of reference signals for communications between the network entity and a UE. The operations of 1505 may be performed in accordance with examples as disclosed herein. In some examples, aspects of the operations of 1505 may be performed by a reference signal manager 1025 as described with reference to FIG. 10.

At 1510, the method may include receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The operations of 1510 may be performed in accordance with examples as disclosed herein. In some examples, aspects of the operations of 1510 may be performed by a measurement report manager 1030 as described with reference to FIG. 10.

At 1515, the method may include transmitting a message indicating a configuration for communications with the network entity in response to receiving the measurement report. The operations of 1515 may be performed in accordance with examples as disclosed herein. In some examples, aspects of the operations of 1515 may be performed by a communications configuration message manager 1035 as described with reference to FIG. 10.

At 1520, the method may include transmitting an indication of one or more candidate UE receive beams in response to receiving the measurement report, where at least one of the one or more candidate UE receive beams corresponds to at least one of the one or more candidate network transmit beams that are additional to the set of multiple network transmit beams. The operations of 1520 may be performed in accordance with examples as disclosed herein. In some examples, aspects of the operations of 1520 may be performed by a candidate beam indication manager 1040 as described with reference to FIG. 10.

Figure 16:
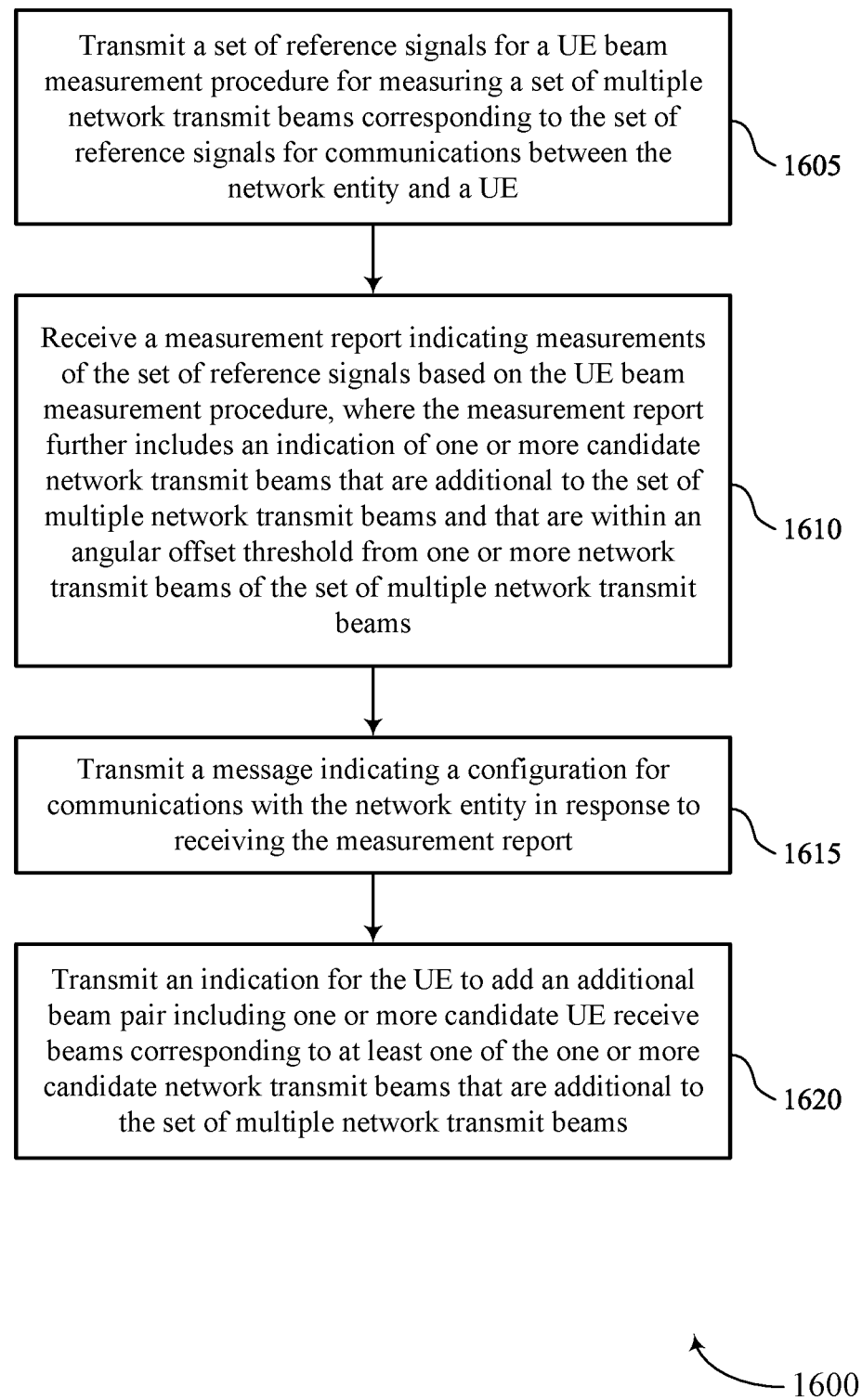

FIG. 16 shows a flowchart illustrating a method 1600 that supports beam measurement reporting for spatially offset beams in accordance with one or more aspects of the present disclosure. The operations of the method 1600 may be implemented by a network entity or its components as described herein. For example, the operations of the method 1600 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a set of reference signals for a UE beam measurement procedure for measuring a set of multiple network transmit beams corresponding to the set of reference signals for communications between the network entity and a UE. The operations of 1605 may be performed in accordance with examples as disclosed herein. In some examples, aspects of the operations of 1605 may be performed by a reference signal manager 1025 as described with reference to FIG. 10.

At 1610, the method may include receiving a measurement report indicating measurements of the set of reference signals based on the UE beam measurement procedure, where the measurement report further includes an indication of one or more candidate network transmit beams that are additional to the set of multiple network transmit beams and that are within an angular offset threshold from one or more network transmit beams of the set of multiple network transmit beams. The operations of 1610 may be performed in accordance with examples as disclosed herein. In some examples, aspects of the operations of 1610 may be performed by a measurement report manager 1030 as described with reference to FIG. 10.

At 1615, the method may include transmitting a message indicating a configuration for communications with the network entity in response to receiving the measurement report. The operations of 1615 may be performed in accordance with examples as disclosed herein. In some examples, aspects of the operations of 1615 may be performed by a communications configuration message manager 1035 as described with reference to FIG. 10.

At 1620, the method may include transmitting an indication for the UE to add an additional beam pair including one or more candidate UE receive beams corresponding to at least one of the one or more candidate network transmit beams that are additional to the set of multiple network transmit beams. The operations of 1620 may be performed in accordance with examples as disclosed herein. In some examples, aspects of the operations of 1620 may be performed by a beam pair indication manager 1045 as described with reference to FIG. 10.

The following provides an overview of aspects of the present disclosure:

Aspect 1: A method for wireless communication at a UE, comprising: receiving a set of reference signals for a UE beam measurement procedure for measuring a plurality of network transmit beams corresponding to the set of reference signals for communications between a network entity and the UE; transmitting a measurement report indicating measurements of the set of reference signals based at least in part on the UE beam measurement procedure, wherein the measurement report further comprises an indication of one or more candidate network transmit beams that are additional to the plurality of network transmit beams and that are within an angular offset threshold from one or more network transmit beams of the plurality of network transmit beams; and receiving a message indicating a configuration for communications with the network entity in response to transmitting the measurement report.

Aspect 2: The method of aspect 1, wherein the measurement report indicates that the one or more candidate network transmit beams are directionally quasi-located with the one or more network transmit beams of the plurality of network transmit beams.

Aspect 3: The method of any of aspects 1 through 2, wherein the plurality of network transmit beams correspond to a first frequency range and the one or more candidate network transmit beams correspond to a second frequency range that is different than the first frequency range, beam widths of beams in the first frequency range are different than beam widths of beams in the second frequency range.

Aspect 4: The method of any of aspects 1 through 3, wherein receiving the message indicating the configuration further comprises: receiving an indication of one or more candidate UE receive beams in response to transmitting the measurement report, wherein at least one of the one or more candidate UE receive beams corresponds to at least one of the one or more candidate network transmit beams that are additional to the plurality of network transmit beams.

Aspect 5: The method of any of aspects 1 through 4, wherein receiving the message indicating the configuration further comprises: receiving an indication for the UE to add an additional beam pair comprising one or more candidate UE receive beams corresponding to at least one of the one or more candidate network transmit beams that are additional to the plurality of network transmit beams.

Aspect 6: The method of aspect 5, wherein the indication for the UE to add the additional beam pair is based at least in part on at least one of one or more reflectors in an environment of the UE, the measurement report, the plurality of network transmit beams, or a combination thereof.

Aspect 7: The method of any of aspects 1 through 6, wherein the configuration indicates one or more synchronization signal blocks associated with one or more candidate UE receive beams corresponding to at least one of the one or more candidate network transmit beams that are additional to the plurality of network transmit beams.

Aspect 8: The method of any of aspects 1 through 7, further comprising: performing the UE beam measurement procedure to measure the set of reference signals on the plurality of network transmit beams to identify one or more power measurements associated with the plurality of network transmit beams, wherein transmitting the measurement report comprises transmitting the measurement report indicating one or more network transmit beams from the plurality of network transmit beams in addition to the one or more candidate network transmit beams in accordance with the one or more power measurements.

Aspect 9: The method of any of aspects 1 through 8, further comprising: identifying a beam failure for at least one of the plurality of network transmit beams; and receiving a set of resources for a beam failure recovery procedure, wherein the set of resources includes at least one of the one or more candidate network transmit beams that are additional to the plurality of network transmit beams.

Aspect 10: The method of any of aspects 1 through 9, wherein the configuration is received via at least one of a DCI signaling, a medium access control (MAC) control element (MAC-CE) signaling, an RRC signaling, or a combination thereof.

Aspect 11: The method of any of aspects 1 through 10, wherein the measurement report is transmitted via at least one of a medium access control (MAC) control element (MAC-CE) signaling, an RRC signaling, or both.

Aspect 12: A method for wireless communication at a network entity, comprising: transmitting a set of reference signals for a UE beam measurement procedure for measuring a plurality of network transmit beams corresponding to the set of reference signals for communications between the network entity and a UE; receiving a measurement report indicating measurements of the set of reference signals based at least in part on the UE beam measurement procedure, wherein the measurement report further comprises an indication of one or more candidate network transmit beams that are additional to the plurality of network transmit beams and that are within an angular offset threshold from one or more network transmit beams of the plurality of network transmit beams; and transmitting a message indicating a configuration for communications with the network entity in response to receiving the measurement report.

Aspect 13: The method of aspect 12, wherein the measurement report indicates that the one or more candidate network transmit beams are directionally quasi-located with the one or more network transmit beams of the plurality of network transmit beams.

Aspect 14: The method of any of aspects 12 through 13, wherein the plurality of network transmit beams correspond to a first frequency range and the one or more candidate network transmit beams correspond to a second frequency range that is different than the first frequency range, beam widths of beams in the first frequency range are different than beam widths of beams in the second frequency range.

Aspect 15: The method of any of aspects 12 through 14, wherein transmitting the message indicating the configuration further comprises: transmitting an indication of one or more candidate UE receive beams in response to receiving the measurement report, wherein at least one of the one or more candidate UE receive beams corresponds to at least one of the one or more candidate network transmit beams that are additional to the plurality of network transmit beams.

Aspect 16: The method of any of aspects 12 through 15, wherein transmitting the message indicating the configuration further comprises: transmitting an indication for the UE to add an additional beam pair comprising one or more candidate UE receive beams corresponding to at least one of the one or more candidate network transmit beams that are additional to the plurality of network transmit beams.

Aspect 17: The method of aspect 16, further comprising: determining to include the additional beam pair comprising one or more candidate receive beams in the configuration based at least in part on one of one or more reflectors in an environment of the UE, the measurement report, the plurality of network transmit beams, or a combination thereof, wherein the indication for the UE to add the additional beam pair is based at least in part on the determining.

Aspect 18: The method of any of aspects 12 through 17, wherein the configuration indicates one or more synchronization signal blocks associated with one or more candidate UE receive beams corresponding to at least one of the one or more candidate network transmit beams that are additional to the plurality of network transmit beams.

Aspect 19: The method of any of aspects 12 through 18, wherein receiving the measurement report further comprises: receiving the measurement report indicating one or more network transmit beams from the plurality of network transmit beams in addition to the one or more candidate network transmit beams in accordance with one or more power measurements at the UE.

Aspect 20: The method of any of aspects 12 through 19, further comprising: identifying a beam failure for at least one of the plurality of network transmit beams; and transmitting a set of resources for a beam failure recovery procedure, wherein the set of resources includes at least one of the one or more candidate network transmit beams that are additional to the plurality of network transmit beams.

Aspect 21: The method of any of aspects 12 through 20, wherein the configuration is transmitted via at least one of a DCI signaling, a medium access control (MAC) control element (MAC-CE) signaling, an RRC signaling, or a combination thereof.

Aspect 22: The method of any of aspects 12 through 21, wherein the measurement report is received via a medium access control (MAC) control element (MAC-CE) signaling, an RRC signaling, or both.

Aspect 23: An apparatus for wireless communication at a UE, comprising a processor; memory coupled with the processor; and instructions stored in the memory and executable by the processor to cause the apparatus to perform a method of any of aspects 1 through 11.

Aspect 24: An apparatus for wireless communication at a UE, comprising at least one means for performing a method of any of aspects 1 through 11.

Aspect 25: A non-transitory computer-readable medium storing code for wireless communication at a UE, the code comprising instructions executable by a processor to perform a method of any of aspects 1 through 11.

Aspect 26: An apparatus for wireless communication at a network entity, comprising a processor; memory coupled with the processor; and instructions stored in the memory and executable by the processor to cause the apparatus to perform a method of any of aspects 12 through 22.

Aspect 27: An apparatus for wireless communication at a network entity, comprising at least one means for performing a method of any of aspects 12 through 22.

Aspect 28: A non-transitory computer-readable medium storing code for wireless communication at a network entity, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
 receiving a set of reference signals for a UE beam measurement procedure for measuring a plurality of network transmit beams corresponding to the set of reference signals for communications between a network entity and the UE;
 transmitting a measurement report indicating measurements of the set of reference signals based at least in part on the UE beam measurement procedure, wherein the measurement report further comprises an indication of one or more candidate network transmit beams that are additional to the plurality of network transmit beams and that are within an angular offset threshold from one or more network transmit beams of the plurality of network transmit beams; and
 receiving a message indicating a configuration for communications with the network entity in response to transmitting the measurement report.

2. The method of claim 1, wherein the measurement report indicates that the one or more candidate network transmit beams are directionally quasi-colocated with the one or more network transmit beams of the plurality of network transmit beams.

3. The method of claim 1, wherein the plurality of network transmit beams correspond to a first frequency range and the one or more candidate network transmit beams correspond to a second frequency range that is different than the first frequency range, wherein beam widths of beams in the first frequency range are different than beam widths of beams in the second frequency range.

4. The method of claim 1, wherein receiving the message indicating the configuration further comprises:
 receiving an indication of one or more candidate UE receive beams in response to transmitting the measurement report, wherein at least one of the one or more candidate UE receive beams corresponds to at least one of the one or more candidate network transmit beams that are additional to the plurality of network transmit beams.

5. The method of claim 1, wherein receiving the message indicating the configuration further comprises:
 receiving an indication for the UE to add an additional beam pair comprising one or more candidate UE receive beams corresponding to at least one of the one or more candidate network transmit beams that are additional to the plurality of network transmit beams.

6. The method of claim 5, wherein the indication for the UE to add the additional beam pair is based at least in part on at least one of one or more reflectors in an environment of the UE, the measurement report, the plurality of network transmit beams, or a combination thereof.

7. The method of claim 1, wherein the configuration indicates one or more synchronization signal blocks associated with one or more candidate UE receive beams corresponding to at least one of the one or more candidate network transmit beams that are additional to the plurality of network transmit beams.

8. The method of claim 1, further comprising:
 performing the UE beam measurement procedure to measure the set of reference signals on the plurality of network transmit beams to identify one or more power measurements associated with the plurality of network transmit beams, wherein transmitting the measurement report comprises transmitting the measurement report indicating one or more network transmit beams from the plurality of network transmit beams in addition to the one or more candidate network transmit beams in accordance with the one or more power measurements.

9. The method of claim 1, further comprising:
 identifying a beam failure for at least one of the plurality of network transmit beams; and
 receiving a set of resources for a beam failure recovery procedure, wherein the set of resources includes at least one of the one or more candidate network transmit beams that are additional to the plurality of network transmit beams.

10. The method of claim 1, wherein the configuration is received via at least one of a downlink control information (DCI) signaling, a medium access control (MAC) control element (MAC-CE) signaling, a radio resource control (RRC) signaling, or a combination thereof.

11. The method of claim 1, wherein the measurement report is transmitted via at least one of a medium access control (MAC) control element (MAC-CE) signaling, a radio resource control (RRC) signaling, or both.

12. A method for wireless communication at a network entity, comprising:
 transmitting a set of reference signals for a user equipment (UE) beam measurement procedure for measuring a plurality of network transmit beams corresponding to the set of reference signals for communications between the network entity and a UE;
 receiving a measurement report indicating measurements of the set of reference signals based at least in part on the UE beam measurement procedure, wherein the measurement report further comprises an indication of one or more candidate network transmit beams that are additional to the plurality of network transmit beams and that are within an angular offset threshold from one or more network transmit beams of the plurality of network transmit beams; and
 transmitting a message indicating a configuration for communications with the network entity in response to receiving the measurement report.

13. The method of claim 12, wherein the measurement report indicates that the one or more candidate network transmit beams are directionally quasi-colocated with the one or more network transmit beams of the plurality of network transmit beams.

14. The method of claim 12, wherein the plurality of network transmit beams correspond to a first frequency range and the one or more candidate network transmit beams correspond to a second frequency range that is different than the first frequency range, wherein beam widths of beams in the first frequency range are different than beam widths of beams in the second frequency range.

15. The method of claim 12, wherein transmitting the message indicating the configuration further comprises:
 transmitting an indication of one or more candidate UE receive beams in response to receiving the measurement report, wherein at least one of the one or more candidate UE receive beams corresponds to at least one of the one or more candidate network transmit beams that are additional to the plurality of network transmit beams.

16. The method of claim 12, wherein transmitting the message indicating the configuration further comprises:
 transmitting an indication for the UE to add an additional beam pair comprising one or more candidate UE receive beams corresponding to at least one of the one or more candidate network transmit beams that are additional to the plurality of network transmit beams.

17. The method of claim 16, further comprising:
determining to include the additional beam pair comprising one or more candidate receive beams in the configuration based at least in part on one of one or more reflectors in an environment of the UE, the measurement report, the plurality of network transmit beams, or a combination thereof, wherein the indication for the UE to add the additional beam pair is based at least in part on the determining.

18. The method of claim 12, wherein the configuration indicates one or more synchronization signal blocks associated with one or more candidate UE receive beams corresponding to at least one of the one or more candidate network transmit beams that are additional to the plurality of network transmit beams.

19. The method of claim 12, wherein receiving the measurement report further comprises:
receiving the measurement report indicating one or more network transmit beams from the plurality of network transmit beams in addition to the one or more candidate network transmit beams in accordance with one or more power measurements at the UE.

20. The method of claim 12, further comprising:
identifying a beam failure for at least one of the plurality of network transmit beams; and
transmitting a set of resources for a beam failure recovery procedure, wherein the set of resources includes at least one of the one or more candidate network transmit beams that are additional to the plurality of network transmit beams.

21. The method of claim 12, wherein the configuration is transmitted via at least one of a downlink control information (DCI) signaling, a medium access control (MAC) control element (MAC-CE) signaling, a radio resource control (RRC) signaling, or a combination thereof.

22. The method of claim 12, wherein the measurement report is received via a medium access control (MAC) control element (MAC-CE) signaling, a radio resource control (RRC) signaling, or both.

23. An apparatus for wireless communication at a user equipment (UE), comprising:
a processor;
memory coupled with the processor; and
instructions stored in the memory and executable by the processor to cause the apparatus to:
receive a set of reference signals for a UE beam measurement procedure for measuring a plurality of network transmit beams corresponding to the set of reference signals for communications between a network entity and the UE;
transmit a measurement report indicating measurements of the set of reference signals based at least in part on the UE beam measurement procedure, wherein the measurement report further comprises an indication of one or more candidate network transmit beams that are additional to the plurality of network transmit beams and that are within an angular offset threshold from one or more network transmit beams of the plurality of network transmit beams; and
receive a message indicating a configuration for communications with the network entity in response to transmitting the measurement report.

24. The apparatus of claim 23, wherein the measurement report indicates that the one or more candidate network transmit beams are directionally quasi-colocated with the one or more network transmit beams of the plurality of network transmit beams.

25. The apparatus of claim 23, wherein the plurality of network transmit beams correspond to a first frequency range and the one or more candidate network transmit beams correspond to a second frequency range that is different than the first frequency range, wherein beam widths of beams in the first frequency range are different than beam widths of beams in the second frequency range.

26. The apparatus of claim 23, wherein the instructions to receive the message indicating the configuration are further executable by the processor to cause the apparatus to:
receive an indication of one or more candidate UE receive beams in response to transmitting the measurement report, wherein at least one of the one or more candidate UE receive beams corresponds to at least one of the one or more candidate network transmit beams that are additional to the plurality of network transmit beams.

27. An apparatus for wireless communication at a network entity, comprising:
a processor;
memory coupled with the processor; and
instructions stored in the memory and executable by the processor to cause the apparatus to:
transmit a set of reference signals for a user equipment (UE) beam measurement procedure for measuring a plurality of network transmit beams corresponding to the set of reference signals for communications between the network entity and a UE;
receive a measurement report indicating measurements of the set of reference signals based at least in part on the UE beam measurement procedure, wherein the measurement report further comprises an indication of one or more candidate network transmit beams that are additional to the plurality of network transmit beams and that are within an angular offset threshold from one or more network transmit beams of the plurality of network transmit beams; and
transmit a message indicating a configuration for communications with the network entity in response to receiving the measurement report.

28. The apparatus of claim 27, wherein the measurement report indicates that the one or more candidate network transmit beams are directionally quasi-colocated with the one or more network transmit beams of the plurality of network transmit beams.

29. The apparatus of claim 27, wherein the plurality of network transmit beams correspond to a first frequency range and the one or more candidate network transmit beams correspond to a second frequency range that is different than the first frequency range, wherein beam widths of beams in the first frequency range are different than beam widths of beams in the second frequency range.

30. The apparatus of claim 27, wherein the instructions to transmit the message indicating the configuration are further executable by the processor to cause the apparatus to:
transmit an indication of one or more candidate UE receive beams in response to receiving the measurement report, wherein at least one of the one or more candidate UE receive beams corresponds to at least one of the one or more candidate network transmit beams that are additional to the plurality of network transmit beams.

\* \* \* \* \*